United States Patent
Kojovic et al.

(10) Patent No.: US 7,180,717 B2
(45) Date of Patent: *Feb. 20, 2007

(54) ELECTRICAL NETWORK PROTECTION SYSTEM

(75) Inventors: Ljubomir A. Kojovic, Racine, WI (US); Martin T. Bishop, Oak Creek, WI (US)

(73) Assignee: Cooper Technologies Company, Houston, TX (US)

( * ) Notice: Subject to any disclaimer, the term of this patent is extended or adjusted under 35 U.S.C. 154(b) by 648 days.

This patent is subject to a terminal disclaimer.

(21) Appl. No.: 10/394,660

(22) Filed: Mar. 24, 2003

(65) Prior Publication Data

US 2004/0008461 A1 Jan. 15, 2004

Related U.S. Application Data

(60) Provisional application No. 60/398,708, filed on Jul. 29, 2002, provisional application No. 60/395,350, filed on Jul. 12, 2002, provisional application No. 60/395,341, filed on Jul. 12, 2002.

(51) Int. Cl.
*H02H 7/00* (2006.01)
(52) U.S. Cl. .......................................... 361/62; 361/63
(58) Field of Classification Search ................ 361/63, 361/62
See application file for complete search history.

(56) References Cited

U.S. PATENT DOCUMENTS

| | | | |
|---|---|---|---|
| 4,623,949 A | 11/1986 | Johnson et al. ............... 361/63 |
| 4,709,205 A | 11/1987 | Baurand et al. ............ 324/127 |
| 4,749,940 A | 6/1988 | Bullock ....................... 324/127 |
| 4,933,630 A | 6/1990 | Dupraz ........................ 324/107 |
| 4,939,449 A | 7/1990 | Cattaneo et al. ......... 324/117 R |
| 5,414,400 A | 5/1995 | Gris et al. .................. 336/174 |
| 5,442,280 A | 8/1995 | Baudart ....................... 324/127 |
| 5,461,309 A | 10/1995 | Baudart ....................... 324/127 |

(Continued)

FOREIGN PATENT DOCUMENTS

EP          0 494 720          7/1992

(Continued)

OTHER PUBLICATIONS

L. Kojovic, "Rogowski Coils Suit Relay Protection and Measurement"; Jul. 1997, pp. 47-52.

(Continued)

*Primary Examiner*—Stephen W. Jackson
(74) *Attorney, Agent, or Firm*—Fish & Richardson P. C.

(57) ABSTRACT

Protection systems for electrical systems are described, where the electrical systems may include spot networks and/or grid networks. The various protection systems may be designed and used to detect and clear faults that may occur within the electrical systems. For example, a pair of Rogowski coils may be used to detect current along a conductors at their respective locations on the conductors, and to output corresponding signals to a multi-function, differential relay having multiple voltage and current inputs. By comparing the signals from the Rogowski coils, the differential relay may determine whether a fault exists at some point along the conductors and between the pair of Rogowski coils. Further, the relay may then, in response to the fault, trip a circuit breaker or other network protection device to address the fault.

61 Claims, 20 Drawing Sheets

U.S. PATENT DOCUMENTS

| | | | |
|---|---|---|---|
| 5,852,395 A | 12/1998 | Bosco et al. | 336/174 |
| 6,313,623 B1 | 11/2001 | Kojovic et al. | 324/127 |
| 6,810,069 B2 * | 10/2004 | Kojovic et al. | 373/60 |
| 6,940,702 B2 * | 9/2005 | Kojovic et al. | 361/62 |
| 2001/0029433 A1 | 10/2001 | Scott | |

FOREIGN PATENT DOCUMENTS

| | | |
|---|---|---|
| GB | 1 355 827 | 6/1974 |

OTHER PUBLICATIONS

E. Thuries, et al.; "Contribution of Digital Signal Processing in the Field of Current Transformers"; 1996, pp. 1-11.

T & M Research Products Inc., "Current Viewing Probe"; pp. 35 and 36.

P. Mahonen et al., "The Rogowski Coil and the Voltage Divider in Power System Protection and Monitoring"; 1996, pp. 1-7.

G. Schett et al., "The Intelligent GIS-A Fundamental Change in the Combination of Primary and Secondary Equipment", CIGRE, 1996, Switzerland, pp. 1-10.

V. Heumann, "Magnetischer Spannungsmesser Hoher Praazision," Elektrotechnische Zeitschrift Ausgabe A, May 21, 1962, Germany, pp. 349-356.

International Search Report, Jan. 23, 2004, 7 pages.

* cited by examiner

ELECTRICAL NETWORK PROTECTION SYSTEM

CLAIM OF PRIORITY

This application claims priority from: (i) U.S. Provisional Application No. 60/395,341, filed Jul. 12, 2002, and titled Electrical Spot Network System, (ii) U.S. Provisional Application No. 60/395,350, filed Jul. 12, 2002, and titled Electrical Protection System, and (iii) U.S. Provisional Application No. 60/398,708, filed Jul. 29, 2002, and titled Electrical Protection System, all three of which are incorporated by reference.

TECHNICAL FIELD

This description relates to detection and clearance of faults in an electrical system.

BACKGROUND

Conventional power systems exist to provide electrical power. In such a power system, faults may occur that are dangerous to users of the system, and that cause damage to the system that may be expensive and/or time-consuming to correct. For example, a power system that experiences a current short-circuit, such as an arc current, may cause a fire or explosion, or otherwise damage itself and related equipment and operators. In particular, very high voltage power systems, such as those that include a high-voltage power transformer, may experience such faults.

When faults are quickly and accurately detected, they may be eliminated by corrective measures, such as an activation of a circuit breaker and, if necessary, subsequent repair of the power system. In this way, damage from the fault may be minimized.

SUMMARY

According to one general aspect, an electrical protection system includes a first Rogowski coil positioned to detect a first current and generate a first current measurement, a second Rogowski coil positioned to detect a second current and generate a second current measurement, wherein a first protection zone is defined based on a positioning of the first Rogowski coil and the second Rogowski coil, and a first protection device operable to determine from the first current measurement and the second current measurement, the existence of a first fault that is associated with a first circuit element within the first protection zone.

Implementations may include one or more of the following features. For example, the first protection device may be operable to detect the first fault using a first protection scheme. The first protection scheme may be a differential protection scheme. The second Rogowski coil may define a second protection zone containing a second circuit element, and the first protection device may be operable to implement a second protection scheme to detect a second fault associated with the second circuit element. In this case, the second protection scheme may include an overcurrent protection scheme, and the first protection device may be operable to integrate protection of the first protection zone and the second protection zone. Also, the first protection device may be operable to provide a third protection zone that serves as a back-up protection zone to the first protection zone and the second protection zone.

The first protection device may be a first differential relay. The system may include a first circuit breaker operable to receive a first instruction from the first protection device and interrupt the first current in response to the first instruction. The first Rogowski coil, the second Rogowski coil, the first protection device, and the first circuit breaker may be all associated with a first network unit of an electrical network system. The system may further include a third Rogowski coil positioned to detect a third current and generate a third current measurement, a fourth Rogowski coil positioned to detect a fourth current and generate a fourth current measurement, wherein a second protection zone is defined based on a positioning of the third Rogowski coil and the fourth Rogowski coil, and a second protection device operable to determine from the third current measurement and the fourth current measurement, the existence of a second fault that is associated with a second circuit element within the second protection zone.

In this case, the second protection device may be a second differential relay. A second circuit breaker may be operable to receive a second instruction from the second protection device and interrupt the third current in response to the second instruction. The third Rogowski coil, the fourth Rogowski coil, the second protection device, and the second circuit breaker may be all associated with a second network unit of the electrical network system, and a communications link may be formed between the first protection device and the second protection device.

In this case, the first network unit and the second network unit may be connected through a bus connection. The first protection device and the second protection device may share the first current measurement, the second current measurement, the third current measurement, and the fourth current measurement over the communications link, and may use the current measurements to determine that a bus fault associated with the bus connection exists.

The second protection device may receive a detection notification through the communications link indicating detection of the first fault by the first protection device. Further, the second protection device may send the second instruction to the second circuit breaker in response to the detection notification. The second protection device may wait a predetermined amount of time after the detection notification before sending the second instruction. In this case, when the second protection device receives, before the predetermined amount of time has elapsed, an operation notification indicating operation of the first circuit breaker in response to the first instruction, the second protection device may not send the second instruction.

When the second protection device does not receive, before the predetermined amount of time has elapsed, an operation notification indicating operation of the first circuit breaker, the second relay may send the second instruction to the second circuit breaker after the predetermined time has elapsed.

The third Rogowski coil, the fourth Rogowski coil, and the second circuit breaker may be connected to the first protection device. In this case, the first protection device may be operable to receive a malfunction notification indicating a malfunction of the second protection device, and the first protection device may be operable to receive the third current measurement and the fourth current measurement and determine that the second fault exists based on the current measurement. Further, the first protection device may be operable to operate the second circuit breaker in response to the second fault.

A third Rogowski coil may be positioned to detect a third current and generate a third current measurement, wherein a second protection zone may be defined based on a positioning of the first Rogowski coil and the third Rogowski coil, and a third protection zone may be defined based on a positioning of the second Rogowski coil and the third Rogowski coil. In this case, the first protection device may be operable to determine from the first current measurement and the third current measurement that a second fault exists that is associated with a second circuit element within the second protection zone.

The first protection device may be operable to determine from the second current measurement and the third current measurement that a third fault exists that is associated with a third circuit element within the third protection zone. The first current may be associated with a first conductor associated with a primary winding of a power transformer, the second current may be associated with a second conductor associated with a secondary winding of the power transformer, and the power transformer may be the first circuit element.

According to another general aspect, an electrical system is protected. A first current through a first conductor in an electrical system is measured using a first Rogowski coil positioned along the first conductor, a first current signal corresponding to the first current is output, a second current through a second conductor in the electrical system is measured using a second Rogowski coil positioned along the second conductor, a second current signal corresponding to the second current is output, and the first current signal and the second current signal are provided to a first protection device.

Implementations may include one or more of the following features. For example, differential protection may be provided to a first circuit element that is positioned within a first protection zone of the electrical system that is defined between the first Rogowski coil and the second Rogowski coil, using the first protection device, and overcurrent protection may be provided to a second circuit element that is positioned within a second protection zone of the electrical system that is defined by a position of the second Rogowski coil, using the first protection device. In this case, back-up protection may be provided within a third protection zone that includes the first protection zone and the second protection zone, using the first protection device.

The first protection device may include a differential relay. The first conductor and the second conductor may be included within a first network unit of the electrical system. Based on the first current signal and the second current signal, it may be determined that a fault associated with the first network unit exists in the electrical system.

A third current through a third conductor in the electrical system may be measured using a third Rogowski coil positioned along the third conductor, a third current signal corresponding to the third current may be output, a fourth current through a fourth conductor in the electrical system may be measured using a fourth Rogowski coil positioned along the fourth conductor, a fourth current signal corresponding to the fourth current may be output, and the third current signal and the fourth current signal may be provided to a second protection device.

The second protection device may include a differential relay. The third conductor and the fourth conductor may be included within a second network unit of the electrical system.

Based on the third current signal and the fourth current signal, it may be determined that a fault associated with the second network unit exists. The first protection device and the second protection device may be connected by a communications link.

The first current signal and the second current signal may be transmitted from the first protection device to the second protection device, and, at the second protection device and based on the first current signal and the second current signal, it may be determined that a fault associated with the first network unit exists.

It may be determined, at the first protection device and based on the first current signal and the second current signal, that a fault exists in the first network unit, and a fault notification indicating the existence of the fault may be transmitted from the first protection device to the second protection device. In this case, a first circuit breaker associated with the first network unit may be opened in response to the fault, and a clearance notification may be transmitted from the first protection device to the second protection device, through the communications link and in response to the opening of the circuit breaker.

A second circuit breaker associated with the second network unit may be opened in response to the fault notification. In response to the clearance notification, electrical power may be routed from the second network unit to the first network unit, through a connection bus connecting the first network unit and the second network unit.

The electrical system may include a connection bus connecting the first network unit to the second network unit, and the connection bus may be connected to the second conductor and the fourth conductor between the first Rogowski coil and the second Rogowski coil.

The first current signal and the second current signal may be transmitted from the first protection device to the second protection device, the third current signal and the fourth current signal may be transmitted from the second protection device to the first protection device, and it may be determined that a fault associated with the connection bus exists, based on the first current signal, the second current signal, the third current signal, and the fourth current signal.

The third current signal may be transmitted from the third Rogowski coil to the first protection device, through a first connection, the fourth current signal may be transmitted from the fourth Rogowski coil to the first protection device, through a second connection, and, at the first protection device and based on the third current signal and the fourth current signal, it may be determined that a fault associated with the second network unit exists.

A third current through a third conductor in the electrical system may be measured using a third Rogowski coil positioned along the third conductor, a third current signal corresponding to the third current may be output, and the third current signal may be input at the first protection device.

It may be determined that a fault exists between the first Rogowski coil and the third Rogowski coil based on the first current signal and the third current signal. It also may be determined that a fault exists between the third Rogowski coil and the second Rogowski coil based on the third current signal and the second current signal.

According to another general aspect, an electrical protection system includes a first pair of Rogowski coils operable to generate a first pair of current signals, the first pair of current signals being associated with a first network unit of the electrical system, a second pair of Rogowski coils operable to generate a second pair of current signals, the second pair of current signals being associated with a second network unit of the electrical system, and a first protection device associated with the first network unit and operable to receive and process the first pair of current signals and the second pair of current signals.

Implementations may include one or more of the following features. For example, the first protection device may provide integrated protection to the first network unit, based on at least one of the first pair of current signals, where the integrated protection includes at least a first protection scheme and a second protection scheme.

The first protection device may be operable to determine, based on the first pair of current signals, that a fault associated with the first network unit exists. A second protection device may be associated with the second network unit and operable to input the second pair of current signals. The first protection device may act as a back-up to the second protection device in detecting that a fault associated with the second network unit exists. In this case, the first protection device may receive the second pair of current signals from the second pair of Rogowski coils, or through the second protection device.

The first protection device and the second protection device may be connected to one another through a communications link. A connection bus may connect the first network unit and the second network unit. The first protection device and the second protection device may determine that a bus fault exists in the connection bus, based on the first pair of current signals and the second pair of current signals.

The details of one or more implementations are set forth in the accompanying drawings and the description below. Other features will be apparent from the description and drawings, and from the claims.

DETAILED DESCRIPTION

Figure 1:
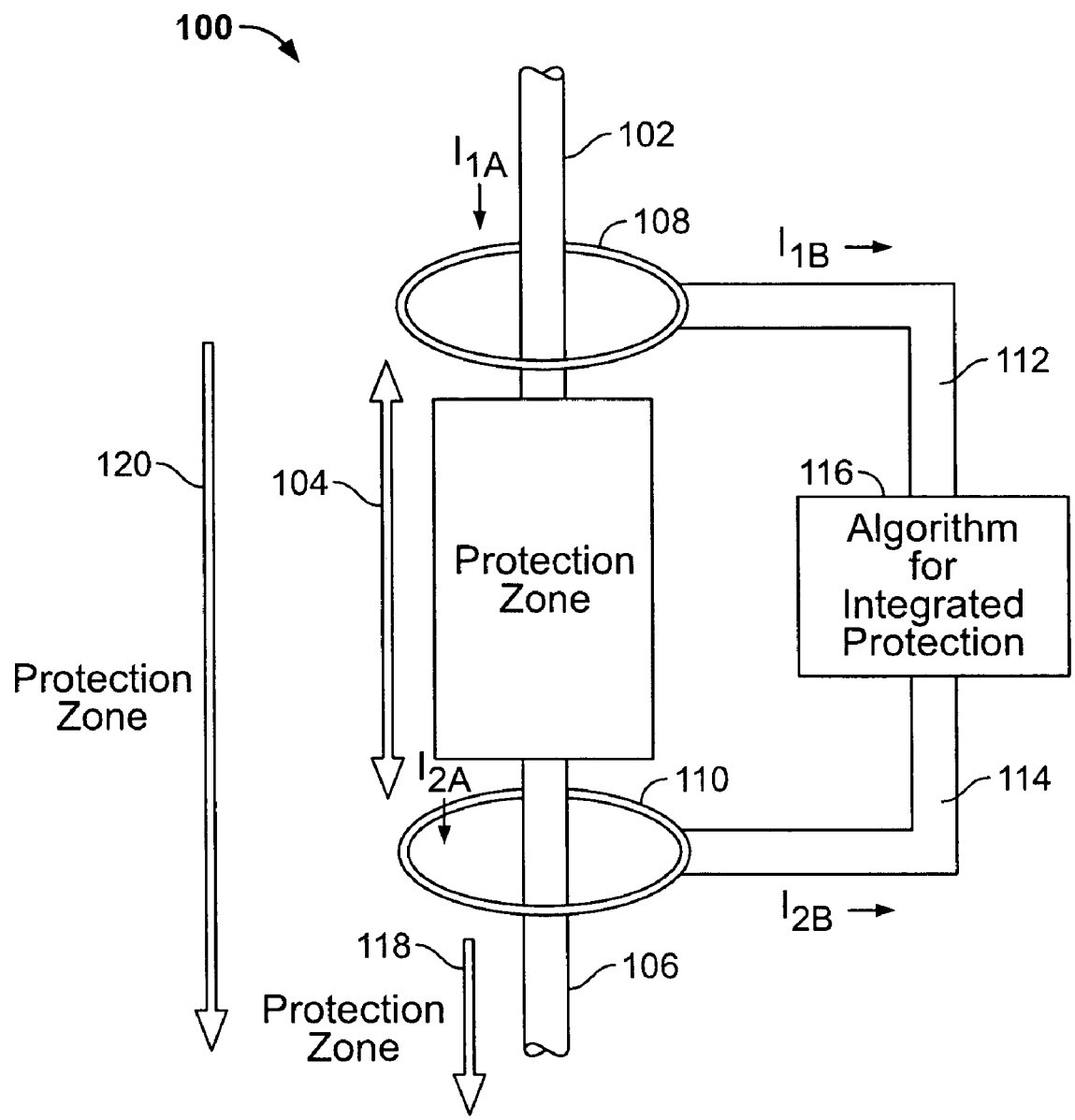
FIG. 1 is a circuit diagram of an electrical protection system.

FIG. 1 is a circuit diagram of an electrical protection system 100 in which a first conductor 102 carries a current $I_{1A}$ to a circuit element within a first protection zone 104. The first protection zone 104 may include one or more circuit elements (not shown), such as, for example, a transformer. Such a transformer might be responsible for converting a first voltage associated with the first conductor 102 into a second voltage that the transformer provides to a second conductor 106 so that a current $I_{2A}$ is output through the second conductor 106. However, any number of circuit elements also could be included within the first protection zone 104.

A first coil 108 encircles the first conductor 102 and outputs a current $I_{1B}$. The first coil 108 may be, for example, a Rogowski coil. Generally speaking, a Rogowski coil includes a conductive element that is wound around a non-magnetic core. The conductive element may be, for example, a metal wire or a metal deposit. The non-magnetic core may be made of any material that has a magnetic permeability that is substantially equal to the permeability of free space, such as, for example, an air core or a printed circuit board (PCB) on which the conductive element is traced.

The coil 108 typically measures a voltage induced in the coil when the conductor 102 is placed within the coil 108, and the current $I_{1B}$ is then calculated based on the measured voltage. Thus, various measuring and/or calculation devices (not shown) may be associated with the coil 108, such as a voltage-measuring device or a current-calculating device. Such devices may include, or be associated with, computer hardware or software for performing their respective functions.

The coil 108 may be constructed according to various techniques. Examples of such techniques are discussed in, for example, U.S. Pat. No. 6,313,623 and U.S. application Ser. No. 10/083,646, both of which are incorporated by reference. For example, the coil 108 may include two or more arms that form a main loop (or loops) of the coil 108 when coupled together. Various winding techniques for winding the conductive element may be used in constructing the coil 108, and the coil 108 may include multiple coils that are associated with one another in various ways. These and other construction details related to the coil 108 may be selected so as to ensure high levels of sensitivity and accuracy in determining the current $I_{1B}$.

A second coil 110 encircles the second conductor 106, and outputs a current $I_{2B}$. The current $I_{1B}$ and the current $I_{2B}$ are output along a first pair of wires 112 and a second pair of wires 114, respectively, to a relay 116. The relay 116, generally speaking, serves to provide integrated protection against short circuits and other system malfunctions and/or failures, as described in more detail below. As such, the relay 116 may be programmed or otherwise associated with a pre-determined algorithm for automatically implementing the integrated protection scheme(s).

With regard to the protection system 100, the relay 116 is capable of providing multiple types of protection against electrical or mechanical malfunctions and failures, and of integrating these types of protection into a cohesive protection scheme. Moreover, the relay 116 is capable of interacting with other relays and/or other coils, in order to provide further options for constructing an integrated electrical protection system.

One type of protection afforded by the relay 116 is differential protection. In a differential protection scheme, the relay 116 operates to compare the currents $I_{1B}$ and $I_{2B}$, in order to ensure that the two currents have some pre-determined relationship to one another. As one example, the relay 116 may determine that an output current, $I_0$, is exceeds a difference of the currents $I_{1B}$ and $I_{2B}$, where a factor may be included to account for acceptable levels of measurement errors. In this way, the relay 116 may protect circuit elements within the first protection zone 104 by, for example, tripping a circuit breaker or other circuit protection element (not shown).

A second type of protection enabled by the relay 116 is overcurrent sensing, in which the relay 116 is pre-programmed with a maximum acceptable current level for a particular portion or element of a circuit. The relay 116 compares an actual current within an overcurrent protection zone, such as the current 12, within a second protection zone 118 (as represented by the curre $I_{2B}$), to the maximum current level. When the maximum current level is exceeded, the relay 116 may then protect elements within the second protection zone 118 by tripping an appropriate circuit breaker.

In another aspect of the protection system 100, a third protection zone 120 may be defined as a back-up protection zone to, for example, one or both of the first protection zone 104 and the second protection zone 120. For example, if the coil 110 were to malfunction and become unavailable, then both the differential protection of the first protection zone 104 and the overcurrent protection of the second protection zone 118 could become unavailable. In this case, the relay 116 may be able to provide, for example, back-up overcurrent protection to all circuit elements within the first and second protection zone 104 and 118, respectively (i.e., to all circuit elements within the third protection zone 120).

The relay 116 may measure the relevant current(s) in a number of ways. For example, the relay may take samples of one or more full cycles of each current, and may use those samples to determine the frequency, amplitude, and/or phase of the current. As another example, the relay 116 may calculate a differential of the current with respect to time. When using the latter methodology, it may not be necessary to obtain a full cycle of the relevant current(s).

The relay 116 may be, for example, a microprocessor-controlled, multi-function relay, such as a three-phase relay having multiple voltage and/or current inputs. As discussed in more detail below, the relay 116 may be in communication with circuit breakers, companion relays, control equipment, and other circuit elements. For example, the relay 116 may be connected to an "upstream" circuit breaker that is located before the coil 108 with respect to the current $I_{1A}$ so that the relay 116 may trip the circuit breaker upon detection of a fault. As another example, the relay 116 may be connected to a network switch/hub that supports having the relay 116 communicate with other relays in implementing an electrical protection system.

In addition, coils 108 and 110 may be connected to a secondary relay (not shown in FIG. 1), either directly through one or more other pairs of wires similar to wires 112 and 114, or indirectly through, for example, a network switch/hub. In this case, the secondary relay may provide fast back-up protection for the relay 116 (thereby protecting the transformer 104 and/or the conductor 102) by receiving current measurements from the coils 108 and 110.

Although a transformer is mentioned above as a circuit element that might be protected by the electrical protection system 100, many other circuit elements may be used. For example, a network bus that distributes power to one or more feeder lines may be protected by such a system. In this case, a different coil (current sensor) may be associated with each of the feeder lines, and the relay 116 may ensure that a current entering the bus is equal to a total current exiting the feeder lines.

Using these and related techniques, sensitive and/or expensive electrical equipment may be protected from damage due to fault currents. Moreover, by placing the coils 108 and 110 around selected pieces of circuitry/equipment, and thereby establishing the protection zones 104, 118, and 120 of FIG. 1, a location as well as an existence of a fault current may be accurately detected. Additionally, a number of current sensors (coils) and relays may be minimized (relative to other electrical protection systems) so as to increase an ease of installation. These and other uses of the system 100 and related systems are discussed in more detail below.

Figure 2:
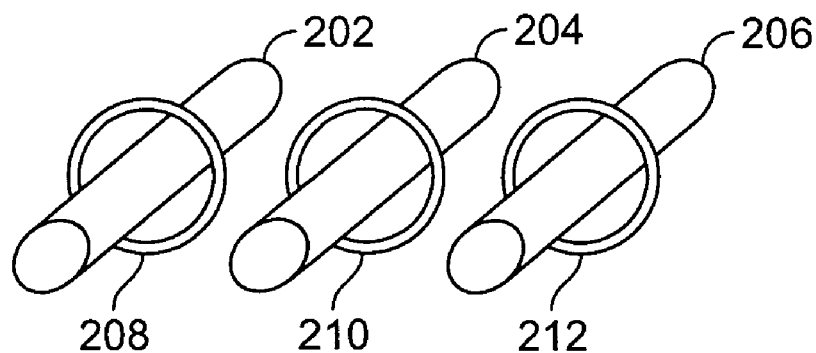
FIG. 2 is a first illustration of Rogowski coils that may be used in the electrical protection system of FIG. 1.

FIG. 2 illustrates Rogowski coils that may be used in the electrical protection system 100 of FIG. 1. As shown, conductors 202, 204, and 206 are encircled by Rogowski coils 208, 210, and 212, respectively. It should be understood that the Rogowski coils are discrete elements that can be separately placed around the conductors 202, 204, and 206.

Figure 3:
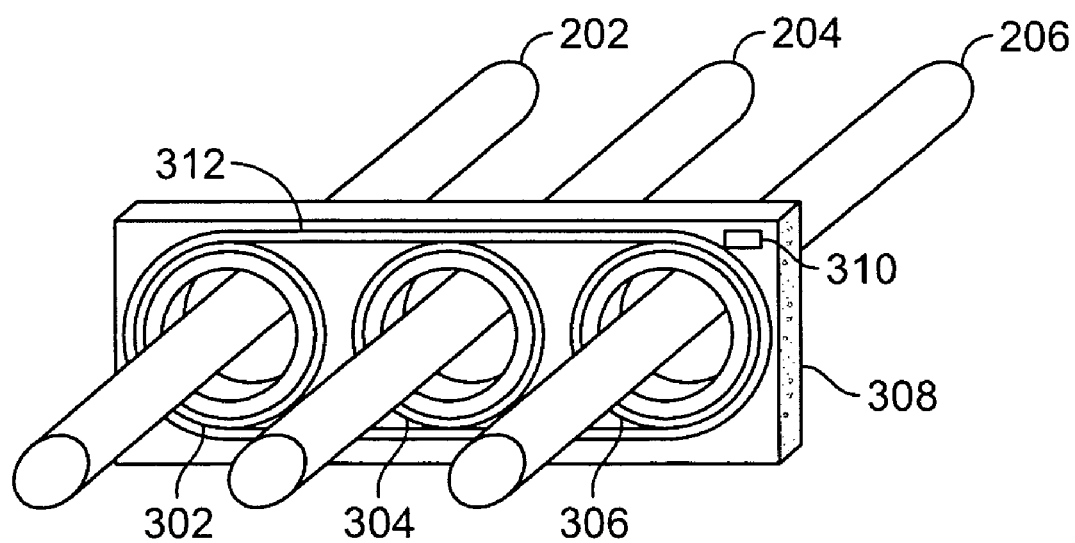
FIG. 3 is a second illustration of Rogowski coils that may be used in the electrical protection system of FIG. 1.

FIG. 3 also illustrates Rogowski coils that may be used in the electrical protection system 100 of FIG. 1. In contrast to FIG. 2, FIG. 3 illustrates Rogowski coils 302, 304, and 306 that are integrally formed within a body 308. A single output connector 310 may be used to obtain outputs of all three of the Rogowski coils 302, 304, and 306. The coils 302, 304, and 306 may be used to measure phase currents in a three-phase system. An additional neutral Rogowski coil 312 may be used for detecting a sum of the currents through the conductors 202, 204, and 206 for the purpose of producing a residual current measurement.

Figure 4:
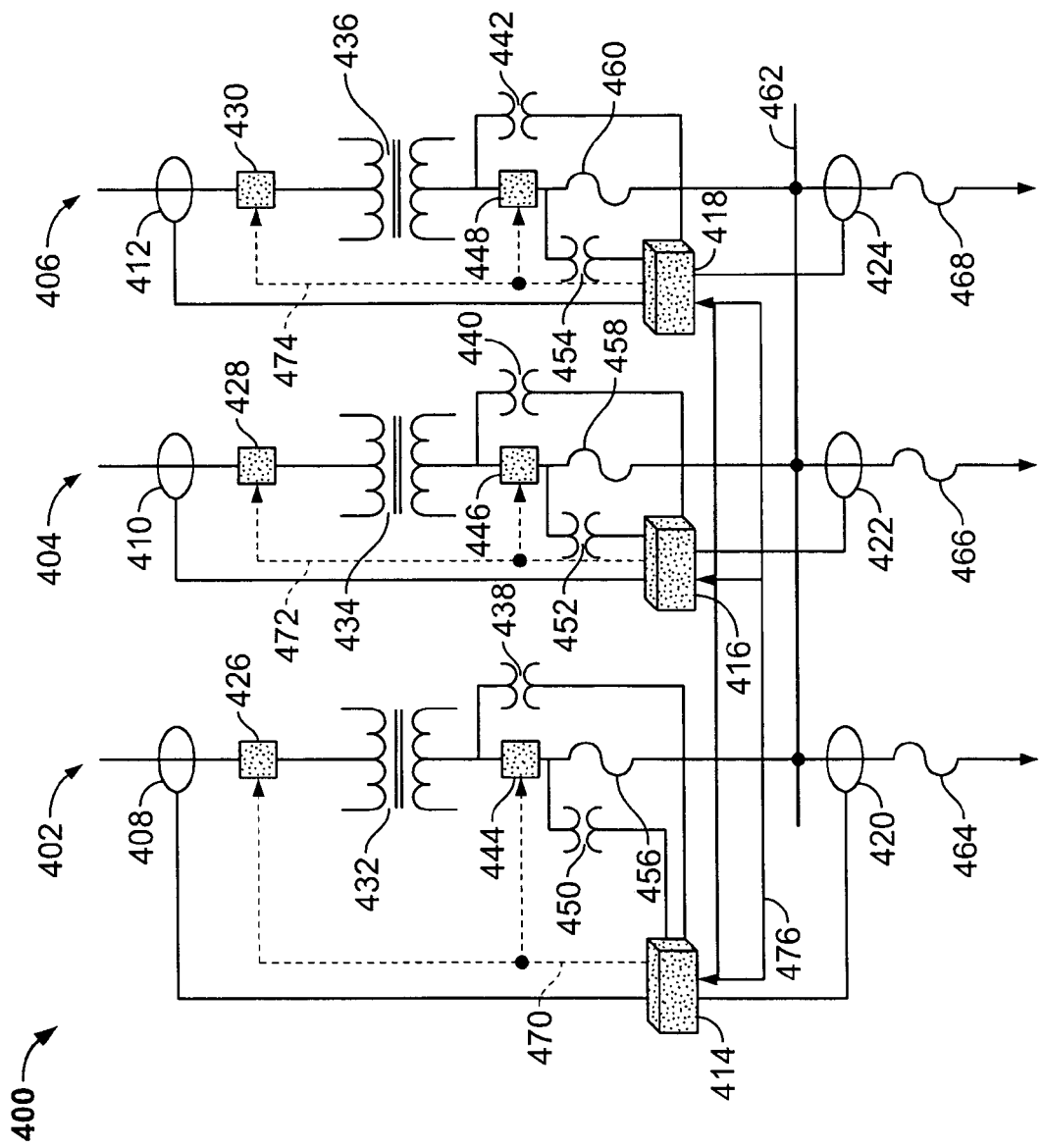
FIGS. 4–7 are circuit diagrams of spot network protection systems.

FIG. 4 is a circuit diagram of a first spot network protection system 400. For the sake of simplicity and clarity, FIG. 4 is illustrated as a single-line diagram. However, it should be understood with respect to FIG. 4 (as well as with respect to following figures), that a given single line may represent two or more similar or identical lines that may exist in a physical implementation. For example, a single-line conductor in FIG. 4 may represent a set of three conductors, such as are illustrated above in FIGS. 2 and 3.

A spot network system, generally speaking, is a network system that is implemented for a single customer load, such as a single commercial building. A spot network may be thought of as a grid network system applied on a smaller scale, where a grid network system is a type of network developed to supply power to densely loaded urban areas in an extremely flexible and reliable manner.

Such spot and grid network systems include multiple network units for transforming power from a primary supplier to a secondary load. Thus, a network unit is typically connected on an input side to a primary cable (e.g., a cable from a power supply company), and on an output side to a secondary cable (e.g., a cable providing service to a customer). Internally, the network unit may contain a primary switching device (for determining whether power is transmitted from the primary cable), a network transformer, and various electrical protection elements, such as circuit breakers and fuses. A more detailed discussion is provided below with respect to spot network system network units. However, similar explanations also may be applied to grid network system network units.

In FIG. 4, the spot network system includes spot network units (SNU) 402, 404, and 406. In the SNUs 402, 404, and 406, respectively, coils 408, 410, and 412 are associated with a primary or input side of each SNU. The coils 408, 410, and 412 are connected to relays 414, 416, and 418. The relays 414, 416, and 418 are further connected to coils 420, 422, and 424, which are associated with a secondary or output side of each SNU.

Thus, as described above with respect to the electrical protection system 100 of FIG. 1, each grouping of two or more coils and a relay serve to provide maintenance and/or protection information. Taking SNU 402 as an example, coils 408 and 420 act as current sensors that provide current measurements to the relay 414, which may be a multi-function, differential relay having multiple current and voltage inputs. The relay 414 compares current measurements from each of the coils 408 and 420 to determine whether, for example, a fault current exists somewhere along the current path between the coil 408 and the coil 420. Such a fault current may be associated with any electrical component associated with the SNU 402 and located between the coils 408 and 420, and any electrical components located between the coils 408 and 420 may be said to be within a "zone of protection" of the coils 408 and 420 and the relay 414. The coils 408 and 420, as well as any of the various coils discussed herein, may be Rogowski coils.

The SNUs 402, 404, and 406 each contain, respectively, primary circuit breakers 426, 428, and 430 that are capable of interrupting power to network transformers 432, 434, and 436 of the SNU. The network transformers 432, 434, and 436 of SNUs 402, 404, and 406 serve to "step-down" a primary voltage at a primary or input side of each transformer 432, 434, and 436 to a lower, secondary voltage at a secondary or output side, and simultaneously serve to "step-up" a primary current to a higher secondary current.

A first set of voltage transformers 438, 440, and 442 detect a voltage at the secondary side of the transformers 432, 434, and 436 at an input of secondary circuit breakers 444, 446, and 448. A second set of voltage transformers 450, 452, and 454 similarly detect a voltage at an output of the secondary circuit breakers 444, 446, and 448. The two sets of voltage transformers are connected to the relays 414, 416, and 418, and serve to, for example, step-down the primary/secondary voltages to levels that are acceptable to the relays 414, 416, and 418. Each of these transformers serves to supply a voltage associated with a measured current to the transformer's respective relays, where such a voltage may be needed to, for example, calculate the magnitude and/or direction of a desired power signal. Moreover, the measured voltages may be used to supply a timing signal to one or more relays for coordinating current measurements, as discussed in more detail below.

For example, secondary circuit breakers 444, 446, and 448 may be low-voltage air circuit breakers, and the relays 414, 416, and 418 may act as reverse power relays (which detect reverse current flow in the SNUs) and/or as phasing relays (which supervise closing of the secondary circuit breakers 444, 446, and 448 by comparing phase angles between a pre-determined pair of voltages).

Fuses 456, 458, and 460 serve as yet further contingent protection for the SNUs 402, 404, and 406.

In addition, all of the SNUs 402, 404, and 406 are connected together by a collector bus 462. The bus 462, among other functions, provides redundancy in the spot network system 400 by allowing power from a working SNU to be transferred to an output of a non-working SNU.

Fuses 464, 466, and 468 provide a final level of protection at an output of the SNUs 402, 404, and 406. The fuses 464, 466, and 468 may be used, for example, to clear sustained high-current faults in the (low-voltage) bus 462, within customer switchgear (not shown), or in an interconnection of the bus 462 to the customer switchgear.

In the spot network system 400, fault detection and clearing may be non-selective or selective. That is, the spot network system 400 may respond to detection of a fault anywhere within the system 400 either by shutting down all of the SNUs 402, 404, and 406, or by shutting down only the SNU in which the fault was detected.

As an example of non-selective fault detection and clearing, for a fault in a zone of protection between the three pairs of coils, one of the relays 414, 416, and 418 may detect the faults and trip the corresponding one of the primary circuit breakers 426, 428, and 430 (and/or one of the secondary circuit breakers 444, 446, and 448), using a corresponding connection 470, 472, or 474 to the circuit breaker. The relays 414, 416, and 418 may communicate with one another to implement the non-selective fault clearing through a communications link such as a network 476.

Such non-selective fault clearing is secure, easy to implement, and cost-effective. However, this implementation also may cause more service interruptions than are necessary.

As an example of selective fault detection and clearing, the relay 414 may detect a fault within the SNU 402, and may respond by tripping the primary circuit breaker 426 and/or the secondary circuit breaker 444. In this example, the relay 414 immediately notifies SNUs 404 and 406, through the network 476, that the relay 414 has detected a fault. The SNUs 404 and 406 continue normal operation for some pre-determined period of time, during which they wait for confirmation that the primary circuit breaker 426 and/or the secondary circuit breaker 444 have in fact been tripped. If such confirmation is received, then the SNUs 404 and 406 continue normal operation, and the bus 462 may be used to route power from one or more of the working SNUs 404 and 406 to an output of the non-working SNU 402. If the confirmation is not received, the relays 416 and 418 trip their respective circuit breakers 428 and 446 and/or 430 and 448.

Such a selective fault clearing implementation may require, for example, further efforts in connecting and programming the relays 414, 416, and 418, when compared to the non-selective implementation described above. However, the selective fault clearing implementation helps minimize the number of outages experienced by a user of the spot network system 400.

Figure 5:
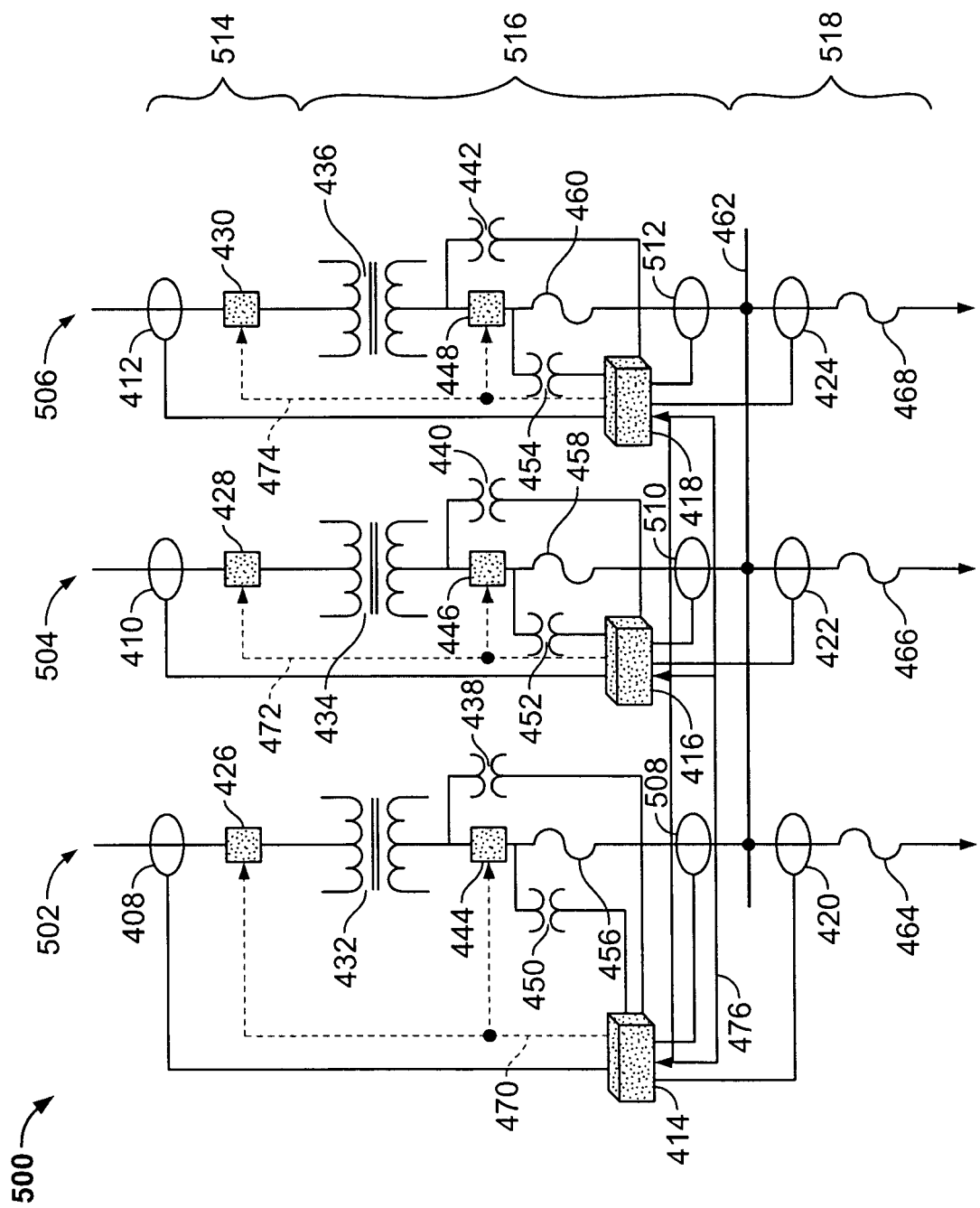

FIG. 5 is a circuit diagram of a second spot network protection system 500. The spot network system 500 includes SNUs 502, 504, and 506, which are similar to the SNUs 402, 404, and 406 of FIG. 4. SNUs 502–506 differ from SNU's 402–406 in that SNUs 502–506 contain additional coils 508, 510, and 512, respectively.

Referring to the SNU 502, the coil 508 is placed with the secondary circuit breaker 444 and fuse 456 on one side, and the bus 462 on the other side. This configuration allows SNU 502 to provide multiple, independent zones of protection. Specifically, a first protection zone 514 includes any primary conductors located on the primary input side of the primary circuit breaker 426. A second protection zone 516 encloses the network power transformer 432, the secondary circuit breaker 444, and any other conductors leading to the coil 508. Finally, a third protection zone 518 encloses the collector bus 462, along with any other conductors leading to the coil 420. It should be understood that the definitions of the protection zones 514, 516, and 518 also apply to the SNUs 504 and 506.

In the spot network system 500, one of the relays 414, 416, and 418 may thus detect a fault in one of the particular protection zones 514, 516, or 518, thereby allowing further selectivity in detecting and clearing faults. For example, for a fault in the transformer 432, the relay 414 may detect overcurrent based on signals from coils 408 and 508, as well as associated reverse power through the SNU 502 (detected through voltage transformers 438 and 450).

Accordingly, the relay 414 may immediately notify the relays 416 and 418 of the fault detection, whereupon the relays 416 and 418 wait for confirmation of appropriate action by the relay 414. If the relay 414 proceeds to take appropriate action, such as, for example, tripping the primary circuit breaker 426 and/or the secondary circuit breaker 444, then the relays 416 and 418 will be so notified, and the SNUs 504 and 506 will continue normal operation. However, if, after some pre-determined amount of time, the relays 416 and 418 do not receive confirmation that the relay 414 has taken appropriate action, then the relays 416 and 418 may trip their associated primary circuit breakers 428 and 430 and/or secondary circuit breakers 446 and 448. In this way, service outages may be reduced, and back-up protection may be provided.

A second example of selective fault clearing in the spot network system 500 may involve a fault in the third protection zone 518, which includes the bus 462. Generally speaking, a fault associated with the bus 462 may be detected as identical or nearly identical changes in the current at each of the relays 414, 416, and 418, since the bus 462 is associated with all of the SNUs 502, 504, and 506. For example, the relays 414, 416, and 418 may detect a sudden increase in primary currents, based on signals from the coils 408, 410, and 412 and the coils 508, 510, and 512. At the same time, secondary currents, as detected by coils 420, 422, and 424, may not change significantly (depending on the fault resistance). Since the relays 414, 416, and 418 are in communication with one another through the network 476, they are each aware of the above information, and can therefore conclude that the fault is within the third protection zone 518, and, accordingly, trip all of the primary circuit breakers 426, 428, and 430.

A third example of selective fault clearing in the spot network system 500 may include a fault in the first protection zone 514. In this case, faults may be detected as described above with respect to FIG. 4.

Figure 6:
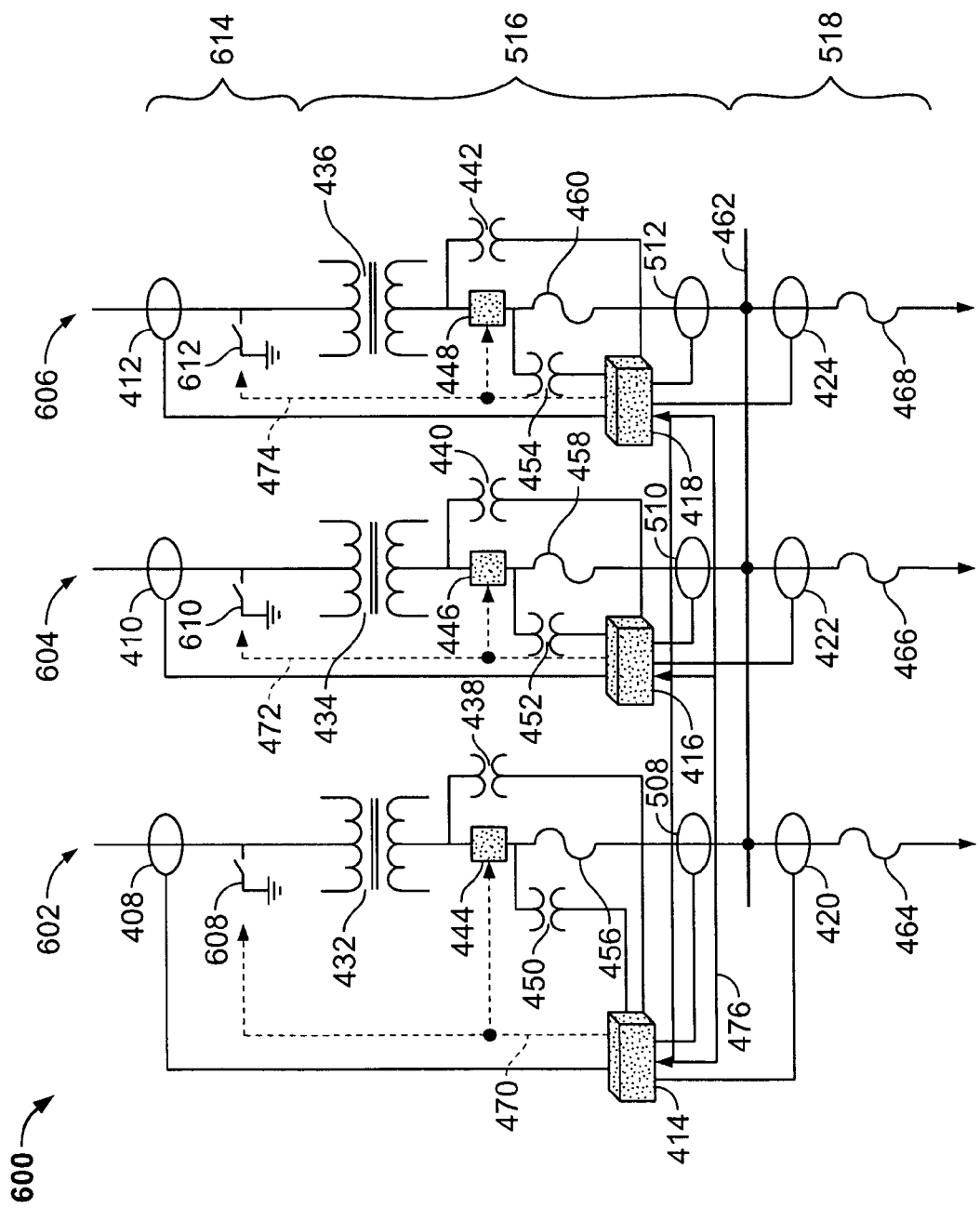

FIG. 6 is a circuit diagram of a third spot network protection system 600. The spot network system 600 includes SNUs 602, 604, and 606, which are similar to the SNUs 402, 404, and 406 of FIG. 4 and the SNUs 502, 504, 506 of FIG. 5. The SNUs 602, 604, and 606 differ from the previously-described SNUs by replacing primary circuit breakers 426, 428, and 430 with fast-grounding switches 606, 608, and 610.

The fast-grounding switches 608, 610, and 612, which are included within a protection zone 614, are designed to close upon occurrence of a low-current fault. In this case, the fault current will increase, thereby forcing a circuit breaker located at an associated power substation (not shown) to interrupt the current. Other techniques exist for tripping such a substation circuit breaker, such as, for example, a direct communication to the substation that the fault has been detected (using, for example, a Wide Area Network (WAN)).

Figure 7:
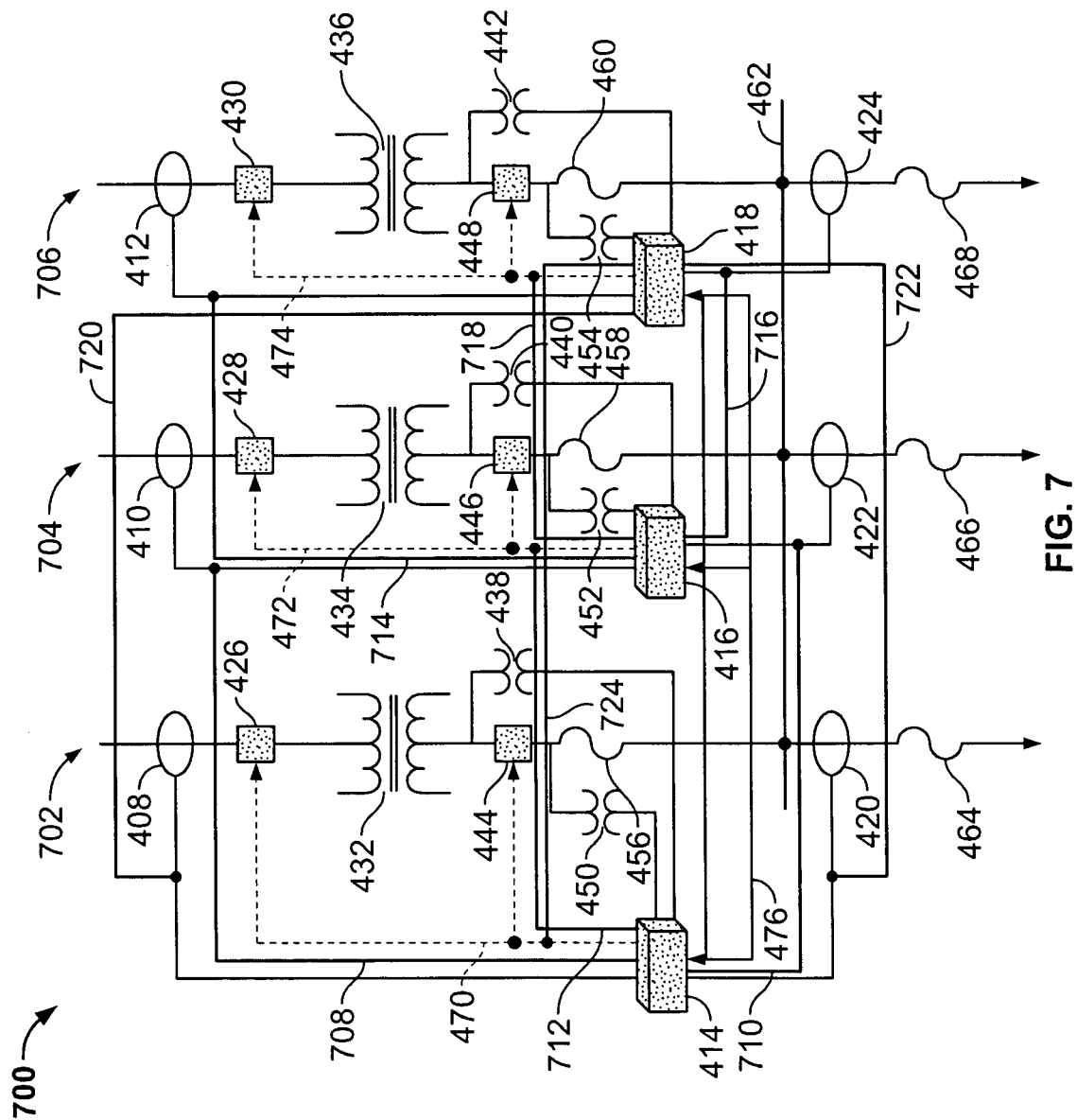

FIG. 7 is a circuit diagram of a fourth spot network protection system 700. The spot network system 700 includes SNUs 702, 704, and 706, which are similar to the SNUs 402, 404, and 406 of FIG. 4. The SNUs 702, 704, and 706 additionally provide main and fast back-up protection, using a number of additional connections (illustrated in bold type in FIG. 7) beyond those illustrated in FIG. 4.

More specifically, in the spot network system 700, each of the SNUs 702, 704, and 706 has the ability to monitor and affect at least one other SNU within the system 700. Thus, in SNU 702, a connection 708 provides the relay 414 with information about a primary current in the SNU 704 (through the coil 410), while a connection 710 provides the relay 414 with information about a secondary current in the SNU 704 (through the coil 422). A control connection 712 provides the relay 414 with the ability to trip one or both of the circuit breakers 428 and 446 within SNU 704.

Similarly, in SNU 704, a connection 714 provides the relay 416 with information about a primary current in the SNU 706, while a connection 716 provides the relay 416 with information about a secondary current in the SNU 706. A control connection 718 provides the relay 416 with the ability to trip one or both of the circuit breakers 430 and 448 within SNU 706.

Finally, in SNU 706, a connection 720 provides the relay 418 with information about a primary current in the SNU 702, while a connection 722 provides the relay 418 with information about a secondary current in the SNU 702. A control connection 724 provides the relay 418 with the ability to trip one or both of the circuit breakers 426 and 444 within SNU 702.

In the system 700, then, relays 414, 416, and 418 provide "fast" back-up protection by receiving direct signals from two or more of the coils 408, 410, 412, 420, 422, and 424. For example, the relay 414 may determine, through the connections 708 and 710, that there is a fault current within the SNU 704. The relay 414 may then wait some predetermined amount of time in order to allow the relay 416 to clear the fault. If the relay 416 does not detect and/or clear the fault within the predetermined amount of time, the relay 414 may directly trip the circuit breakers 428 and/or 446 of SNU 704 using the control connection 712.

Moreover, even when a fault does not currently exist, a relay that becomes inoperable will be detected by (or will notify) the remaining relays. For example, the relay 418 may become inoperable or removed for maintenance, whereupon the relay 416 may be notified (or otherwise become aware) that it should assume responsibility for measuring currents through the SNU 706, through the connections 714 and 716. If necessary, the relay 416 can, upon detection of a fault, trip the circuit breakers 430 and 448 of SNU 706 using the control connection 718.

In the implementation of FIG. 7 and related implementations, the fast back-up protection can be provided very quickly, without impacting an overall speed of fault clearance or an area of a given protection zone.

Although specific implementations have been discussed above with respect to FIGS. 1–7, variations on, or combinations of, these implementations also may be implemented. For example, in the implementation of the spot network system 700 of FIG. 7, nine coils may be used to provide a greater number of protection zones (similarly to the implementation of the spot network system 500 of FIG. 5), rather than the six coils illustrated in FIG. 7. As another example, a "hot line tag" on an overhead power supply line may be incorporated to instantaneously activate the relays 414, 416, and 418 when line crews begin work on a piece of network equipment.

Various other elements may be used in conjunction with the described implementations. For example, a heat sensor, an ultraviolet light sensor, a smoke detector, or a sudden pressure relay (SPR) in a transformer may be used to provide additional, or (in some cases) alternative protection to various circuit elements within the spot network systems.

Although implementations discussed above primarily relate to spot network systems, similar techniques can be used in grid network systems, as well as in many other types of systems. For example, in grid network systems, a number of coils at a corresponding number of grid outputs may all be wired to a single relay that compares the total of the various output currents to an input current of the grid network.

Additionally, although the implementations of FIGS. 4–7 focus on systems having three network units, other implementations may have less or more network units, with corresponding numbers of coils and/or relays.

As discussed above, Rogowski coils may be used as the current sensing coils of FIGS. 4–7. Rogowski coils are very sensitive to even low-level current changes, and are thus capable of, for example, detecting and clearing sustained arcing fault currents. Such fault currents generally are at a small fraction of the maximum available fault current, and not much higher than the load currents themselves.

The ability to detect small current changes means that fault detection levels may be set relatively low, thereby reducing stress on (or damage to) equipment and speeding fault response times, without sacrificing reliability. Moreover, a risk of fire propagation is reduced, and faster response times (including a faster restoration of service) may be provided.

Rogowski coils may be designed not to saturate, and therefore may be capable of handling large currents, and avoiding false tripping of circuit breakers that may be caused by faults outside the network unit (e.g., faults within customer equipment). Additionally, Rogowski coils are generally immune to external magnetic fields, and therefore avoid any effects of such fields on current measurements. Moreover, Rogowski coils are relatively inexpensive, and may not require substantial space or wiring. Finally, Rogowski coils are easily installed by, for example, simply placing the relevant conductor through the coils (or by placing the coils around the conductor).

In both spot network systems and grid network systems, reliability of service is a primary design goal. As a result, maintenance of such systems may be difficult, since failed components may go unnoticed until one or more of their back-up components also fail. In the described implementations, however, information about both a magnitude and location of a fault may be provided, using pre-defined protection zones. Thus, faults may be pinpointed and corrected before a redundancy of the relevant system is exhausted.

As shown above, the fault detection techniques of the various implementations may be applied at a primary side and/or a secondary side of a network unit, to provide main and backup protection both locally and over a communication system. The protection may be selective or non-selective to varying degrees, depending upon the needs of a particular user.

Figure 8:
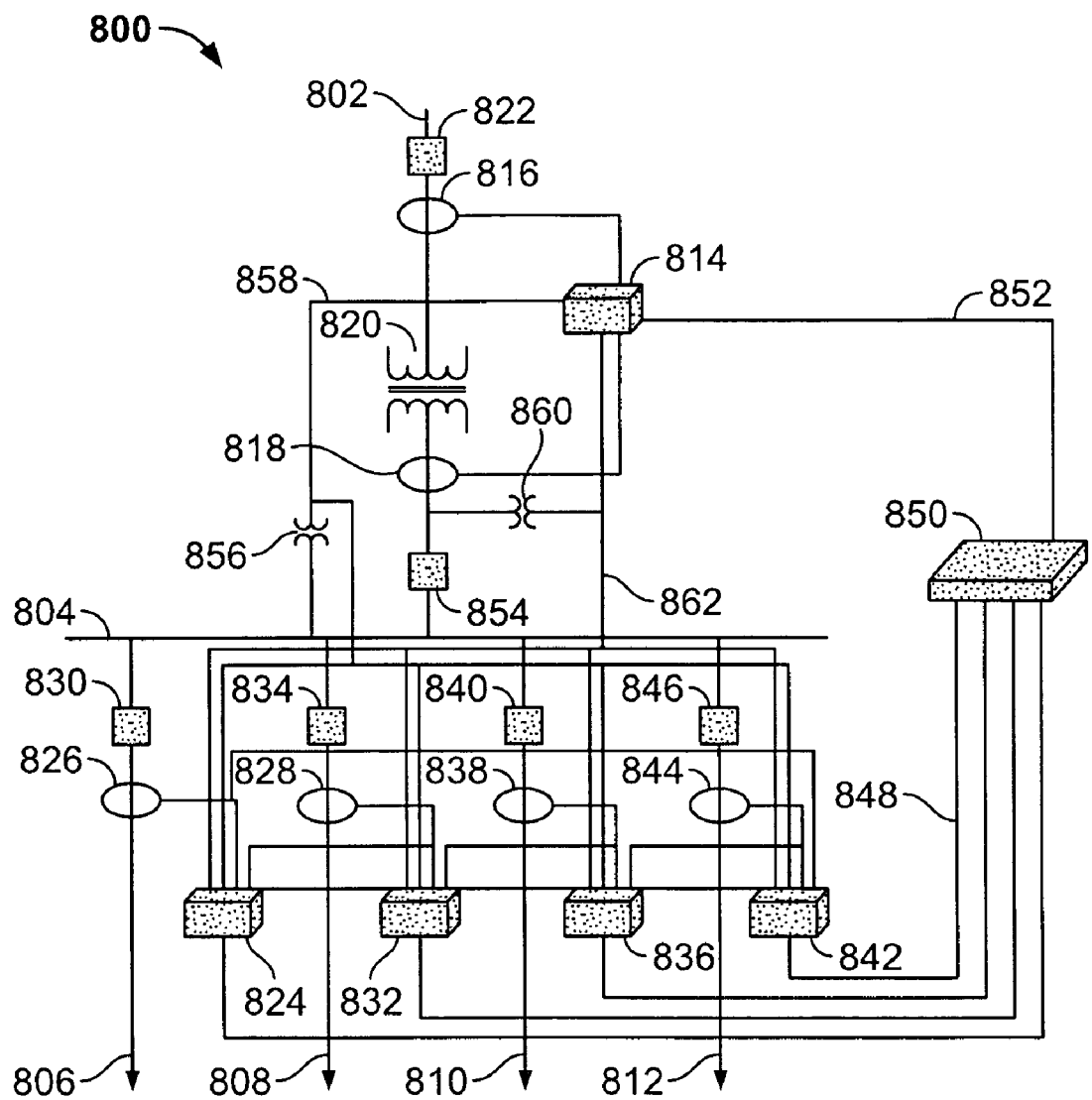
FIGS. 8–12 are circuit diagrams of substation protection systems.

FIG. 8 is a circuit diagram of a substation protection system 800. In FIG. 8, a primary or input feeder 802 provides power over a bus 804 to secondary or output feeders 806, 808, 810, and 812. A primary relay 814 receives current information about currents on the input feeder 802 through a coil 816 and a coil 818. Using the current information from coils 816 and 818, the primary relay 814 provides main protection for a power transformer 820.

Specifically, as described above, the primary relay 814 may be a multi-function differential relay having multiple current and voltage inputs, and may compare the current information from coils 816 and 818 to discern an unacceptable differential therebetween. Upon detecting such a differential, the primary relay 814 trips a circuit breaker 822 to interrupt incoming current on the input feeder 802. While the primary relay 814 is connected to the circuit breaker 822 (as shown above in FIGS. 4–7), this connection is not shown in FIG. 8 for the sake of clarity.

A first feeder relay 824 is directly connected to a coil 826 associated with the first feeder 806, and to another coil 828 that is associated with the second feeder 808. From the coil 826, the first feeder relay 824 obtains information regarding a current on the first feeder 806. By comparing the current to a predetermined maximum allowable current, the first feeder relay 824 provides main protection for the first feeder 806 in the form of overcurrent sensing. When the first feeder relay 824 determines that a fault exists, the relay 824 trips a circuit breaker 830 to interrupt power to the first feeder 806.

Similarly, a second feeder relay 832 provides main protection for the second feeder 808. That is, the second feeder relay 832 senses any overcurrent on the second feeder 808 by way of the coil 828, and clears the fault by tripping a circuit breaker 834. Moreover, using the direct connection to the coil 828, the first feeder relay 824 provides overcurrent sensing back-up protection for the second feeder 808. Specifically, the first feeder relay 824 monitors information from the coil 828, and, upon determining that the second feeder relay 832 is inoperative, trips the circuit breaker 824 when detecting a fault on the second feeder 808.

The first feeder relay 824 may determine that the second feeder relay 832 is inoperative by, for example, detecting that a fault on the second feeder 808 has not been cleared after some predetermined amount of time. Alternatively, the second feeder relay 832 may send out a signal upon detection of its own malfunction, or a third party (e.g., a repair person) may notify the first feeder relay 824 of the malfunction at the second feeder relay 832. As a final example, the first feeder relay 824 may periodically transmit status requests to the second feeder relay 832, and may assume malfunction when a reply is not received. Techniques for allowing these and other communications between the relays 824 and 832 (and other relays within the system 800) are discussed in more detail below.

Analogously, a third feeder relay 836 provides primary overcurrent protection to the third feeder 810 using a connection to a coil 838 to determine whether to trip a circuit breaker 840. The second feeder relay 832 is directly connected to the coil 838 and the circuit breaker 840, and thus provides fast back-up protection for the third feeder relay 836.

A fourth feeder relay 842 provides primary protection to the fourth feeder 812 using a connection to a coil 844 to determine whether to trip a circuit breaker 846. The third feeder relay 836 is directly connected to the coil 844 and the circuit breaker 846, and thus provides fast back-up protection for the fourth feeder relay 842. Also, the fourth feeder relay 842 is directly connected to the coil 826 and the circuit breaker 830, and thus provides fast back-up protection for the first feeder relay 824.

In summary, the first feeder relay 824 provides main protection for the first feeder 806 and back-up protection for the second feeder 808. The second feeder relay 832 provides main protection for the second feeder 808 and back-up protection for the third feeder 810. The third feeder relay 836 provides main protection for the third feeder 810 and back-up protection for the fourth feeder 812. Finally, the fourth feeder relay 842 provides main protection for the fourth feeder 812 and back-up protection for the first feeder 806.

Thus, the relays 824, 832, 836, and 842, acting in their capacities as fast back-ups, reduce a time during which fault current flows on a malfunctioning feeder, and thereby reduce stress on system components (relative to conventional systems).

In addition to the main and fast back-up protections just described, the feeders 806, 808, 810, and 812 are connected by connections 848 to a communications switch or hub 850, which, in turn, is connected by a connection 852 to the primary relay 814. Using information exchanged through the communications hub 850, the primary relay 814 provides main differential protection for the bus 804, as well as fast back-up overcurrent protection for all of the feeders 824, 832, 836, and 842.

In providing main differential protection for the bus 804, the primary relay 814 receives information about a current flowing in the first feeder 806, based on measurements taken by the coil 826 and transmitted through the first feeder relay 824, the connections 848, the communications hub 850, and the connection 852. The primary relay 814 similarly receives information about the currents flowing in each of the remaining feeders 832, 836, and 842.

Then, acting in a differential mode of operation, the primary relay 814 compares, for example, a sum of the currents in the four feeders 806, 808, 810, and 812 to a current flowing into the bus 804 (as detected by the coil 818, which is directly connected to the primary relay 814). Based on this comparison, the primary relay 814 determines whether a fault exists that is associated with the bus 804. For example, the primary relay 814 may determine that a simultaneous current decrease has occurred in each of the four feeders 806, 808, 810, and 812, and as a result, may determine that a fault exists in the bus 804. In such cases, the relay 814 may trip a circuit breaker 854, to interrupt power to the bus 804.

Although the communications hub 850 may communicate information between the various relays very quickly, there may nonetheless be some amount of delay in transmitting the various signals. When comparing current signals from each of the four feeders 806, 808, 810, and 812 to a current signal from the primary feeder 802, the primary relay 814 may thus require relative timing information for the current signals in order to account for this delay (as well as other delays that may occur) and make a meaningful comparison of the current signals.

Such timing information can be obtained from various sources. For example, an external synchronizing network may be set up to provide timing information. As another example, the relays 824, 832, 836, and 842 may time-stamp their respective current measurements before transmission of the measurements. Timing information (for example, for the time-stamps) may be used relative to a voltage signal obtained from a voltage transformer 856, and shared between the various relays using a connection 858. Similarly, a voltage transformer 860 may be used as an alternative or back-up source of timing information using a connection 862. Of course, the voltage transformers 856 and 860 may be used for various other purposes, such as detecting a magnitude and/or direction of a particular power signal, as described above with respect to FIG. 4.

In providing fast back-up overcurrent protection for each of the feeders 806, 808, 810, and 812, the primary relay 814 determines that one or more of the relays 824, 832, 836, or 842 has become inoperative to some degree. The primary relay 814 then assumes responsibility for the overcurrent-sensing duties of the inoperative relay, using measurements taken by the relevant coil and transmitted to the primary relay 814 through, for example, the inoperative relay (or the inoperative relay's back-up relay) and the communications hub 850.

Summarizing many of the above-described operations of the electric protection system 800 of FIG. 8, the primary relay 814 provides main differential protection for the power transformer 820 (using coils 816 and 818), main differential protection for the bus 804 (using coil 818 and feeder coils 826, 828, 838, and 844), and secondary back-up protection for each of the feeders 806, 808, 810, and 812 (using direct connections between each feeder relay and at least one other feeder coil).

In the various communications used in these protection techniques, the communications hub 850 (and associated connections 848 and 852) may be used to allow, for example, centralized digital communications. Additionally, or alternatively, the various relays may communicate with one another (and other circuit elements) using, for example, digital or analog peer-to-peer communications over connections 858 and/or 862. Moreover, the various connections, including the connections 848, 852, 856, and 862, may be used as back-up connections for one another.

In FIG. 8, and as referred to above, it should be understood that the various protection schemes may require all of the various relays to be connected to one or more of the various circuit breakers in a manner similar to that illustrated in FIGS. 4–7. However, for the sake of clarity, these connections are not illustrated in FIG. 8.

As described herein, Rogowski coils may be used as any of the various coils discussed with respect to FIG. 8, and the use of such Rogowski coils may impart various advantages. For example, although multiple Rogowski coils may be used in the place of any particular one of the coils shown in FIG. 8, as needed, the ability of a particular Rogowski coil to avoid saturation may allow a single Rogowski coil to provide current measurements at virtually all required current levels. Moreover, a Rogowski coil may supply sufficient power to its associated relay(s) to reduce or eliminate the need for separate relay power sources. These and various other advantages of using Rogowski coils in the protection techniques described herein, such as those discussed above with respect to FIGS. 4–7, apply to the above discussion of FIG. 8, as well as the following discussion of FIGS. 9–25.

In FIG. 8, the primary relay 814 provides main protection of the transformer 820 and main protection of the bus 804. In FIG. 8, these protections are independent of one another. For example, if the coil 816 were to fail (thereby eliminating the protection of the transformer 820), the primary relay 814 is still able to provide primary protection for the bus 804 (using the coil 818, as described above).

Figure 9:
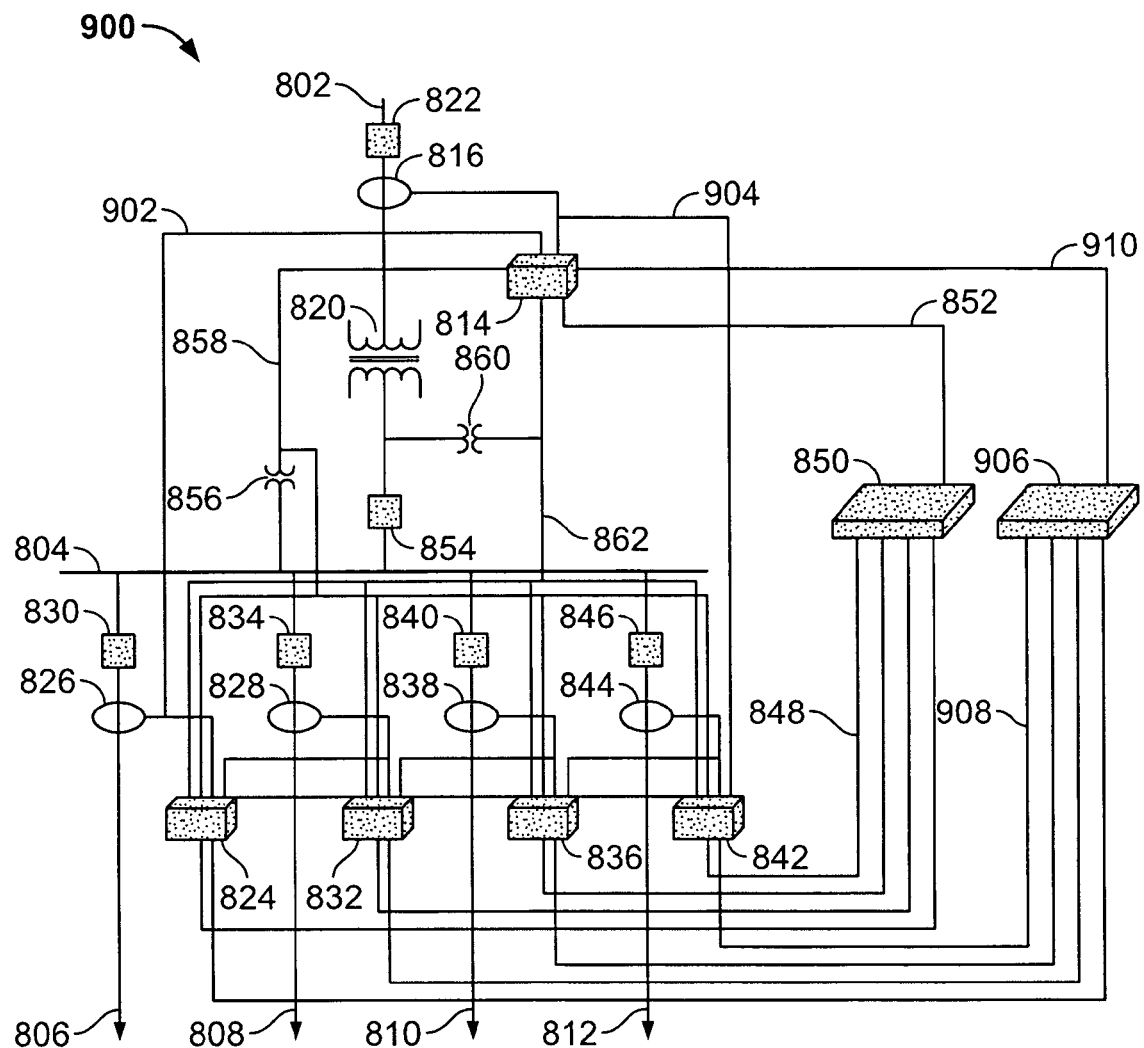

FIG. 9 is a circuit diagram of a substation protection system 900. In FIG. 9, the coil 818 is not used. As a result, although the primary relay 814 provides primary protection for the transformer 820 and the bus 804, these protections are no longer independent of one another. That is, the relay 814 relies on the coil 816 to provide all information about current that is "upstream" of the bus 804. Should the relay 816 become inoperable, then protection for both the transformer 820 and the bus 804 would be affected. Although this implementation results in a loss of redundancy in protecting the bus 804, it also requires one less coil, and therefore may be less expensive and easier to install and configure than the protection system 800 of FIG. 8.

The protection system 900 of FIG. 9 further includes other variations from the protection system 800 of FIG. 8. For example, in the protection system 900, the primary relay 814 provides fast back-up protection for the first feeder 806. This functionality is accomplished by way of a connection 902 between the coil 826 and the primary relay 814, and relieves the fourth feeder relay 842 from serving as the fast back-up to the first feeder 806 (as illustrated in FIG. 8).

Additionally, a connection 904 included in the protection system 900 connects the fourth feeder relay 842 to the coil 816 and the primary relay 814. This connection may be used, for example, to allow the fourth feeder relay 842 to act as a fast back-up to the primary relay 814, thereby helping to make up for the loss of redundancy caused by the removal of the coil 818.

Finally, a secondary communications hub 906 is connected to the feeder relays through a connection 908, and is connected to the primary relay 814 through a connection 910. The secondary communications hub 906 may serve as a back-up to the communications hub 850.

In the protection system 900, then, main differential protection of both the power transformer 820 and the bus 804 is accomplished by the primary relay 814 (using the coil 816 and the feeder coils 826, 828, 838, 844). Fast backup protection for the feeders 808, 810, and 812 is accomplished as described above with respect to FIG. 8, and fast backup protection of the feeder 806 is accomplished by the primary relay 814 (using the connection 902 to the coil 826). The primary relay 814 further provides back-up protection for all four of the feeders 806, 808, 810, and 812, based on signals transmitted by the communications hubs 850 and/or 906.

Figure 10:
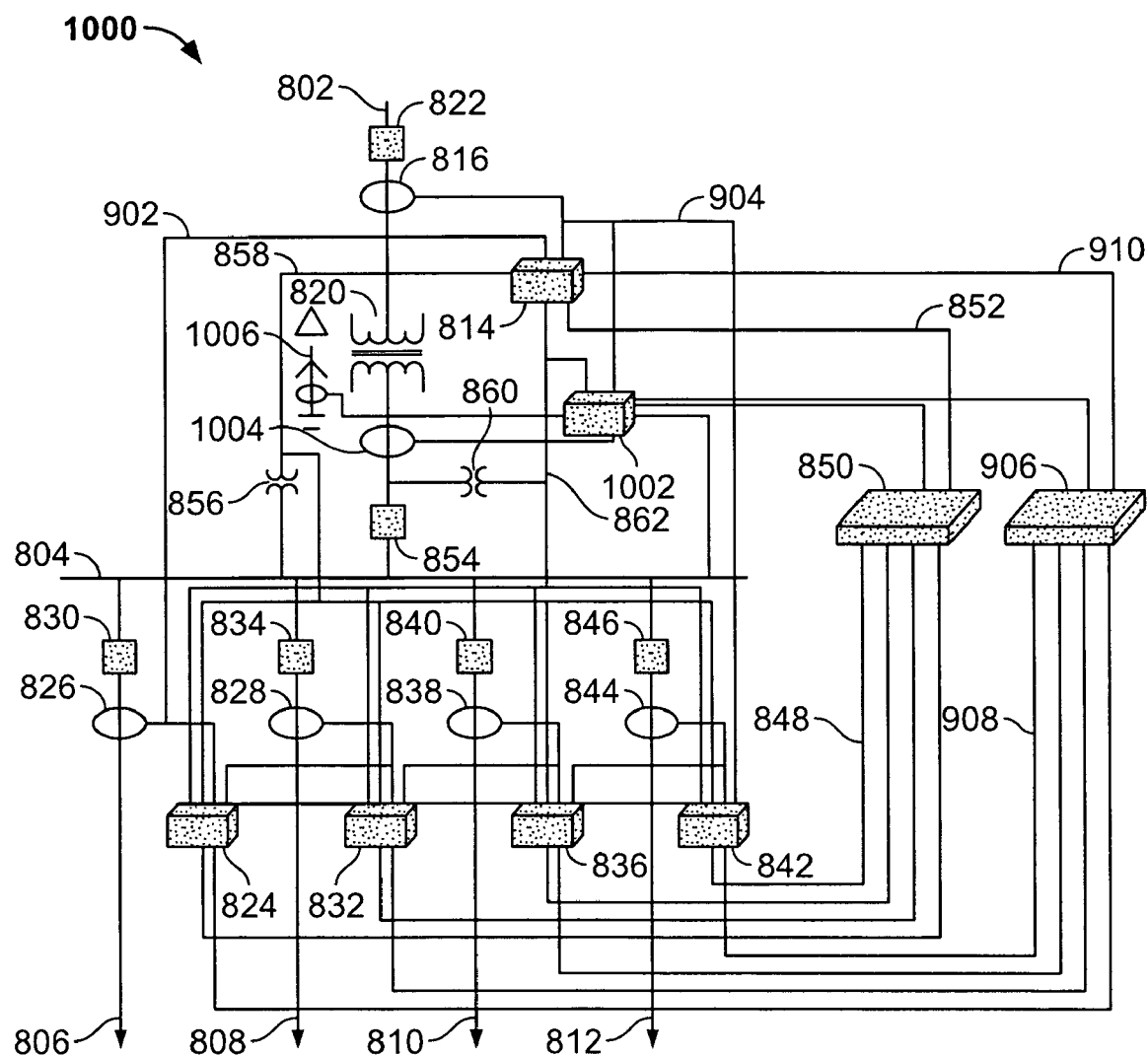

FIG. 10 is a circuit diagram of a substation protection system 1000 that includes a relay 1002 connected to a coil 1004 (located between the transformer 820 and the circuit breaker 854). The relay 1002 is further connected to a coil 1006 that is installed in a neutral winding of the transformer 820. The relay 1002 is also connected to the coil 816, the connections 858 and 862, and the communications hubs 850 and 906.

In the protection system 1000, as in the protection system 900 of FIG. 9, the primary relay 814 provides main differential protection of the transformer 820 (using the coil 816 and the feeder coils 826, 828, 838, and 844), and fast back-up protection for the first feeder 806 (using the connection 902 to the coil 826). Other connections in common with the protection system 900 also act in the manner described above.

The relay 1002 provides main differential protection for the bus 804 using an output of the coil 1004 in conjunction with outputs of the feeder coils 826, 828, 838, and 844. It should be understood that this protection is independent of the main differential protection provided to the transformer 820 by the primary relay 814.

The relay 1002 also provides main restricted ground fault protection for the transformer using the coil 1006. Additionally, the relay 1002 provides back-up differential protection for the power transformer 820.

Many variations on the systems of FIGS. 8–10 also may be implemented. For example, in the protection system 1000, the primary relay 814 may be connected to the coil 1004 so that the primary relay 814 may be used to provide fast back-up differential protection for the bus 804. Also, the connections 902 and 904 may be removed in the protection system 1000, and fast back-up protection for the four feeders 806, 808, 810, and 812 may be provided in the manner described with respect to the protection system 800.

Figure 11:
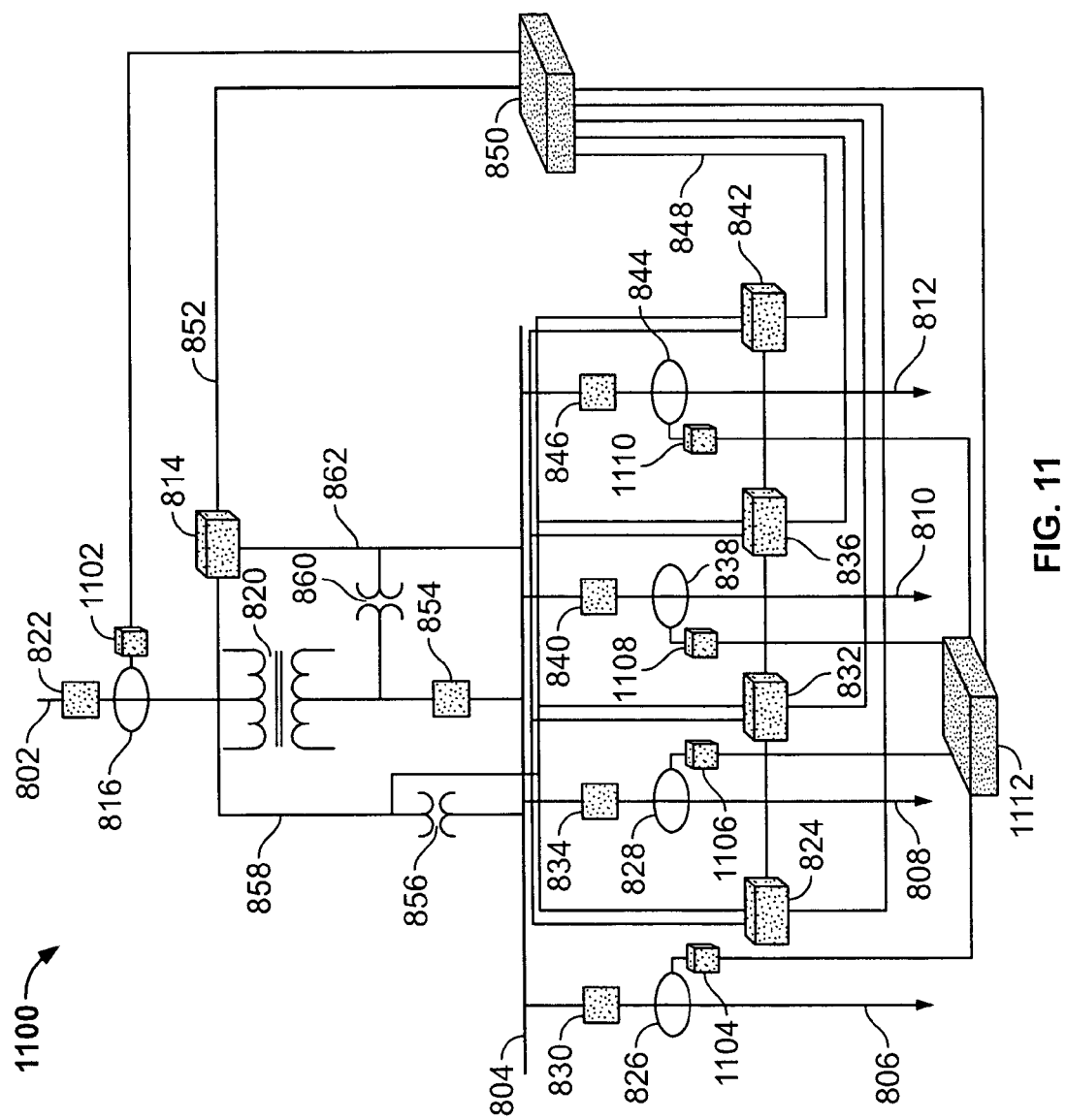

FIG. 11 is a circuit diagram of an electrical protection system 1100 in which all of the various relays are connected through analog-to-digital (A/D) converters (each which converts coil output signals to digital signals at the coil locations) to the communications hub 850. Specifically, the hub 850 receives the output of an A/D converter 1102 connected to the coil 816, an A/D converter 1104 connected to the coil 826, an A/D converter 1106 connected to the coil 828, an A/D converter 1108 connected to the coil 838, and an A/D converter 1110 connected to the coil 844. Outputs of the A/D converters 1104, 1106, 1108, and 1110 are congregated at a communications hub 1112, that is connected to the communications hub 850.

In FIG. 11, then, all of the current signals from the various coils are shared among the relays through the communications hubs 850 and 1112. As in FIGS. 8–10, the various relays remain connected to one another through the connections 858 and 862, and the voltage transformers 856 and 860 are also connected to the relays through the connections 858 and 862.

Thus, some of the functionality of the implementations of FIGS. 8–10 may be implemented in the protection system 1100. For example, the various relays may communicate with one another using the connections 858 and/or 868, and may obtain synchronization/timing information from the transformers 856 and/or 860.

In FIG. 11, current signals from all of the various coils are available to all of the various relays, through the communication hubs 850 and 1112. Moreover, associated voltage signals also are available to the various relays through the connections 858 and/or 862. As a result, main and back-up protection for components, including the transformer 820, the bus 804, and the feeders 806, 808, 810, and 812, may be designed in various ways, including many of the techniques described above.

For example, the first feeder relay 824 may serve as primary protection for the first feeder 806, and as back-up protection for the second feeder relay 832 (and thereby the second feeder 808), as in FIGS. 8–10. As another example, the primary relay 814 may be used to provide back-up protection to the first feeder relay 824 (and thereby the first feeder 806), as in FIGS. 9 and 10.

Other protection techniques, not explicitly described above, also may be implemented. For example, the third feeder relay 826 may be used to provide back-up protection for the first feeder relay 824. In fact, virtually any one or more of the various relays may be used to provide back-up protection for any one or more of the remaining relays.

By sharing all current signals over a digital communications medium, greater design flexibility may be afforded by the protection system 1100, compared to the protections systems of FIGS. 8–10. Moreover, more of the design, implementation, and maintenance of the protection system 1100 may be implemented in software, for example, at one or both of the communications hubs 850 and 906, or in separate computer hardware (not shown).

Figure 12:
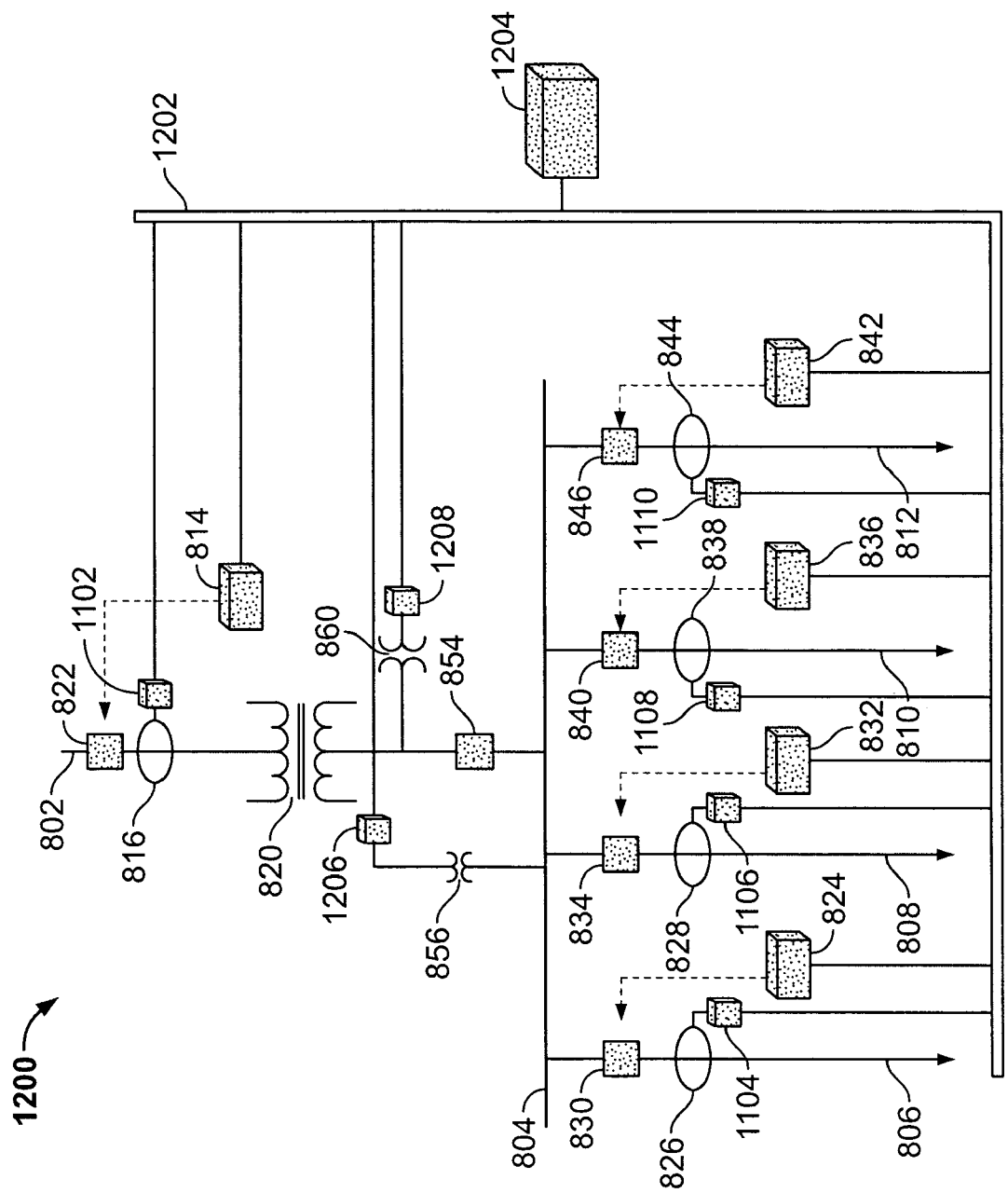

FIG. 12 is a circuit diagram of an electrical protection system 1200. In FIG. 12, the A/D converters 1102, 1104, 1106, 1108, and 1110 are all connected to a connection 1202, which in turn is connected to a computing resource 1204. Additionally, the voltage transformers 856 and 860 are connected to an A/D converter 1206 and an A/D converter 1208, respectively.

Thus, in FIG. 12, all voltage and current detection signals are digitized, and shared via the connection 1202 and the computing resource 1204. In comparison to the systems of FIGS. 8–11, it should be noted that the connections 858 and 862 are not included in the protection system 1200 (although they could be included as a back-up communications technique).

By sharing all of the various voltage and current detection signals at one central location, an even greater number of main and back-up protection designs may be implemented in computer software than in the protection system 1100 of FIG. 11. In FIG. 12, as opposed to FIGS. 8–11, direct connections between the various relays and their associated circuit breakers are illustrated. However, even the circuit breakers 822, 830, 834, 840, and 846 could be connected to connection 1202, and thereby controlled by the computer resource 1204.

Figure 13:
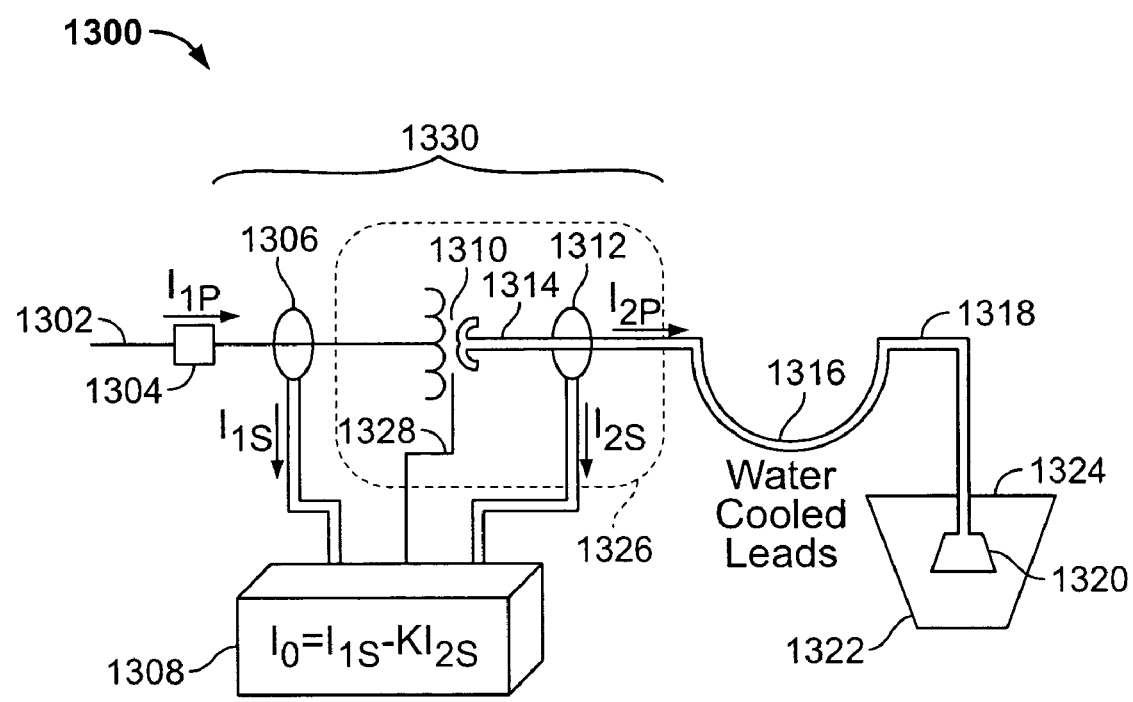
FIG. 13 is a circuit diagram of a first electric arc furnace (EAF) protection system.

FIG. 13 is a circuit diagram of a first electric arc furnace protection system 1300. In FIG. 13, a primary input receives power on a primary conductor 1302 from, for example, an electric utility. A protection system, such as a circuit breaker 1304, is included in the electric arc furnace (EAF) protection system 1300, so as to interrupt power to the EAF upon detection of a fault by interrupting a path of a first primary current $I_{1P}$ along the primary conductor 1302.

A first coil 1306 outputs a first secondary current $I_{1S}$, which is based on the primary current $I_{1P}$, and outputs the first secondary current $I_{1S}$ to a protection device, such as a multi-function, three-phase, differential relay 1308 having multiple current and voltage inputs.

A transformer 1310 steps down a voltage associated with the first primary current $I_{1P}$, and correspondingly steps up the first primary current $I_{1P}$ into a second primary current $I_{2P}$. The second primary current $I_{2P}$ is detected by a second coil 1312 as a second secondary current $I_{2S}$, which also is input into the relay 1308. The second primary current $I_{2P}$ may be within the range of, for example, 50 kA–80 kA or more.

The second primary current $I_{2p}$ flows on a conductor 1314 to water-cooled leads 1316, which, in turn, are connected to conducting arms 1318. The conducting arms 1318 are coupled to an electrode 1320 that is lowered into a furnace 1322 that is covered by a lid 1324.

In operation, the furnace typically contains, for example, steel scrap or other ferrous material. The electrode 1320 is lowered into the furnace 1322, and a current is passed through the electrode 1320 to form an arc. The arc generates enough heat to melt the scrap within the furnace 1322, so that the scrap may be turned into various types of special-quality steels (e.g., steel alloys) or ordinary-quality steels (e.g., non-alloy steels).

Variations of the above-described elements, and related elements, may be implemented. For example, multiple of transformers may be used in place of the single transformer 1310, so as to, for example, step down an initial voltage in multiple steps. In such a case, a medium-voltage transformer may be followed by a heavy duty furnace transformer. As another example, a bus-bar assembly may be used to provide an electrical connection between the water-cooled leads 1316 and the electrodes 1320.

A number of different secondary voltages may be applied to the electrode 1320, depending on, for example, the type of steel scrap being melted. In order to vary the secondary voltage, a tap position of the transformer 1310 may be changed. A current tap position at a given time is communicated to the relay 1308 by a tap signal 1328.

The transformer 1310 and the second coil 1312 may be enclosed within a vault 1326 that is designed to provide a secure and clean environment. Together, the vault 1326 and its internal elements (which also may include, for example, a bus-bar assembly, surge arresters, and secondary transformers (e.g., voltage transformers) that may be installed on the primary side of the transformer 1310 for metering and control), along with the first coil 1306, are included within a protection zone 1330 within which electrical faults may be detected by the relay 1308.

In the EAF protection system 1300, it should be understood that the relay 1308 operates in a manner similar to the various relays discussed above. For example, the relay 1308 determines whether the two secondary currents $I_{1S}$ and $I_{2S}$ are within some pre-determined differential of one anther. Specifically, the relay 1308 determines that $I_O=I_{1S}-kI_{2S}$, where $I_O$ is generally zero and the constant "k" represents a level of error in the difference that will be accepted before the relay 1308 determines that a fault exists within the protection zone 1330.

Although faults in the furnace transformer 1310 or otherwise associated with the vault 1326 are often time-consuming and expensive to repair, the circuit breaker 1304, by itself, often is only able to detect faults which occur upstream from the transformer 1310. By using the relay 1308 in conjunction with the two coils 1306 and 1312 (and/or with additional coils, as discussed below with respect to FIG. 17), fault protection also may be afforded to elements which are located at or downstream of the transformer 1310.

In using Rogowski coils as the coils 1306 and 1312, many or all of the advantages of Rogowski coils that are described above are imparted to the EAF protection system 1300, including low-cost and ease of installation, use, and maintenance. For example, the Rogowski coils can be designed in a split-core style, so that disconnection of conductors is not needed during installation. The Rogowski coils may be designed to be immune to external magnetic fields, to avoid saturation, and to react to low-level faults (thereby avoiding undue stress on the related components).

Moreover, by using a microprocessor-based relay as the relay 1308, current signals detected at the coils 1306 and/or 1312 may be manipulated in various ways. For example, digital current signals may be easily scaled within the relay 1308 using multipliers with scaling factors designed to develop an internal relay signal that matches a magnitude of the current being monitored. As another example, just as the signal magnitude can be scaled, a phase angle associated with a particular current signal can be shifted as needed using numerical manipulation in algorithms associated with the relay 1308. As a final example, a harmonic restraint algorithm may be implemented in the relay 1308 in order to avoid undesirable tripping of the circuit breaker 1304 in the event of energization inrush currents (i.e., currents which result when the transformer is initially switched on).

In using such a microprocessor-based relay 1308, a computing resource, such as, for example, a personal computer, may be used during operation of the relay 1308 to observe the calculated protection quantities in real time. Such real time observations may permit fine calibration adjustments to be made, even after installation, in order to achieve high sensitivity.

Also, as mentioned above, a tap position of the transformer 1310 may be changed during operation for the purpose of varying the secondary voltage delivered by the transformer 1310. During such changes, currents in the system 1300 may temporarily reach levels that might erroneously be determined to be fault events. Moreover, once the tap position change has taken place, the currents will be altered, requiring corresponding changes to, for example, the relay 1308.

Performing such tap position changes may be performed in the EAF protection system 1300 using the tap position signal 1328. For example, the tap position signal 1328 may be passed to the relay 1308 through a Programmable Logic Controller ("PLC"), or through some other technique for communicating the tap position information to the relay 1308. The relay 1308 may store (or otherwise have access to) a look-up table of winding rations of the transformer 1310 at the transformer's various tap positions, and may use the look-up table to correct the current signals received from the coils 1306 and 1312 during and after tap position changes. As a result, the coil/relay combination accounts for the different winding ratios of the transformer 1310, and restraint settings of the relay 1308 may be set with a high sensitivity.

In the EAF protection system 1300, Rogowski coils may provide metering-class accuracy in measurements of their output current signals. For example, Rogowski coils can be designed to measure currents to better than 0.1% precision, with a typical precision of 1%–3% or better. Additionally, because they do not typically saturate, the Rogowski coils offer a wide measurement range, such as, for example, from several amps to several hundred thousand amps. As a result, such coils may be used to measure currents having a large DC component. Also, such Rogowski coils may operate over a wide frequency range, such as from approximately 0.1 Hz to over 1 MHz. Rogowski coils also may be designed to provide a bandpass frequency response of up to approximately 200 MHz or more.

Figure 14:
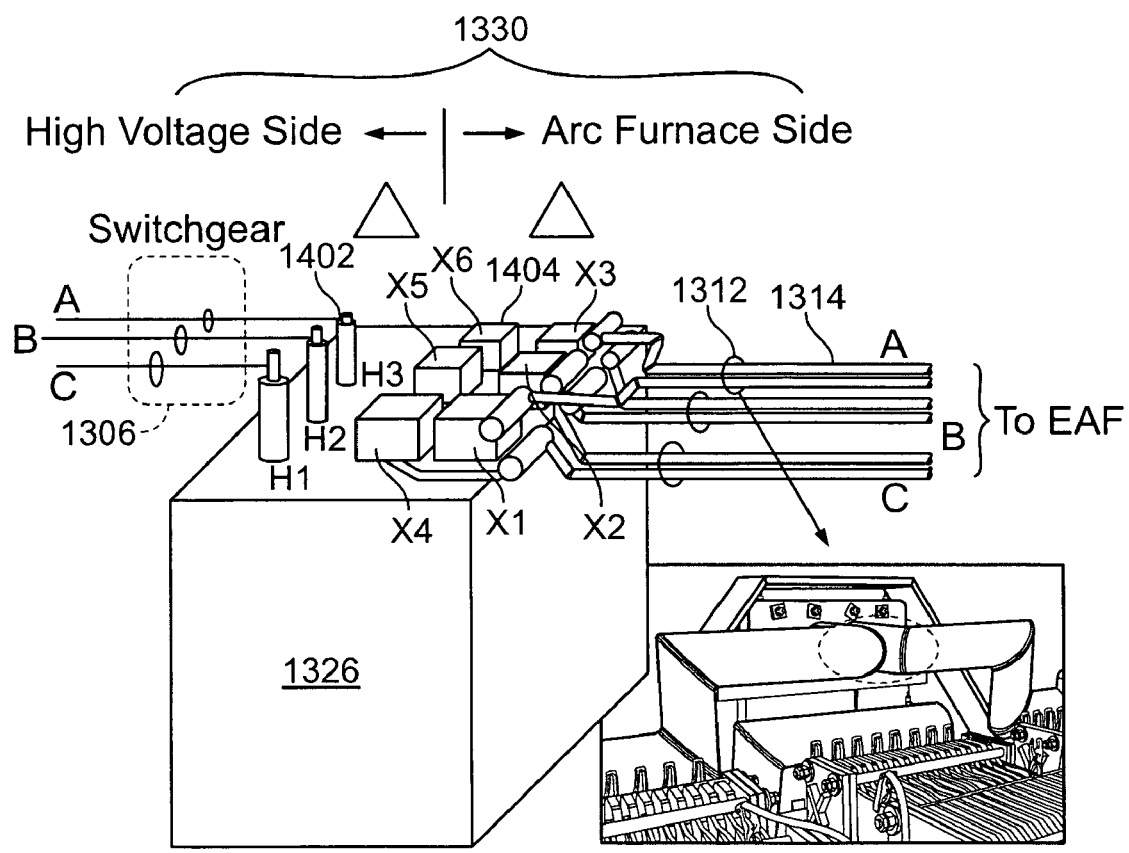
FIG. 14 is a diagram of an implementation of the EAF protection system of FIG. 13.

FIG. 14 illustrates an implementation of the EAF protection system 1300 of FIG. 13. Generally speaking, the coils 1306 and 1312 may be installed in a number of locations. For example, the coils 1306 and 1312 may be mounted on a wall of the vault 1326 at a point where the bus penetrates the wall. In FIG. 14, the coils 1306 are located around conductors 1302, which are connected to bushings 1402 (labeled h1–h3), and mounted on a switchgear device 1404 that is responsible for switching the transformer 1310 (see FIG. 15 and the associated discussion). The coils 1312 are connected to low-voltage terminals 1406 (labeled X1–X6). In FIG. 14, the coils 1306 are configured in a manner similar to that illustrated in FIGS. 2 and 3, with each phase of the conductor(s) 1302 enclosed by a separate one of the coils 1306. The coils 1306 and 1312 may be customized to accommodate the conductors associated with the vault 1326 in ways other than that illustrated in FIG. 14.

Figure 15:
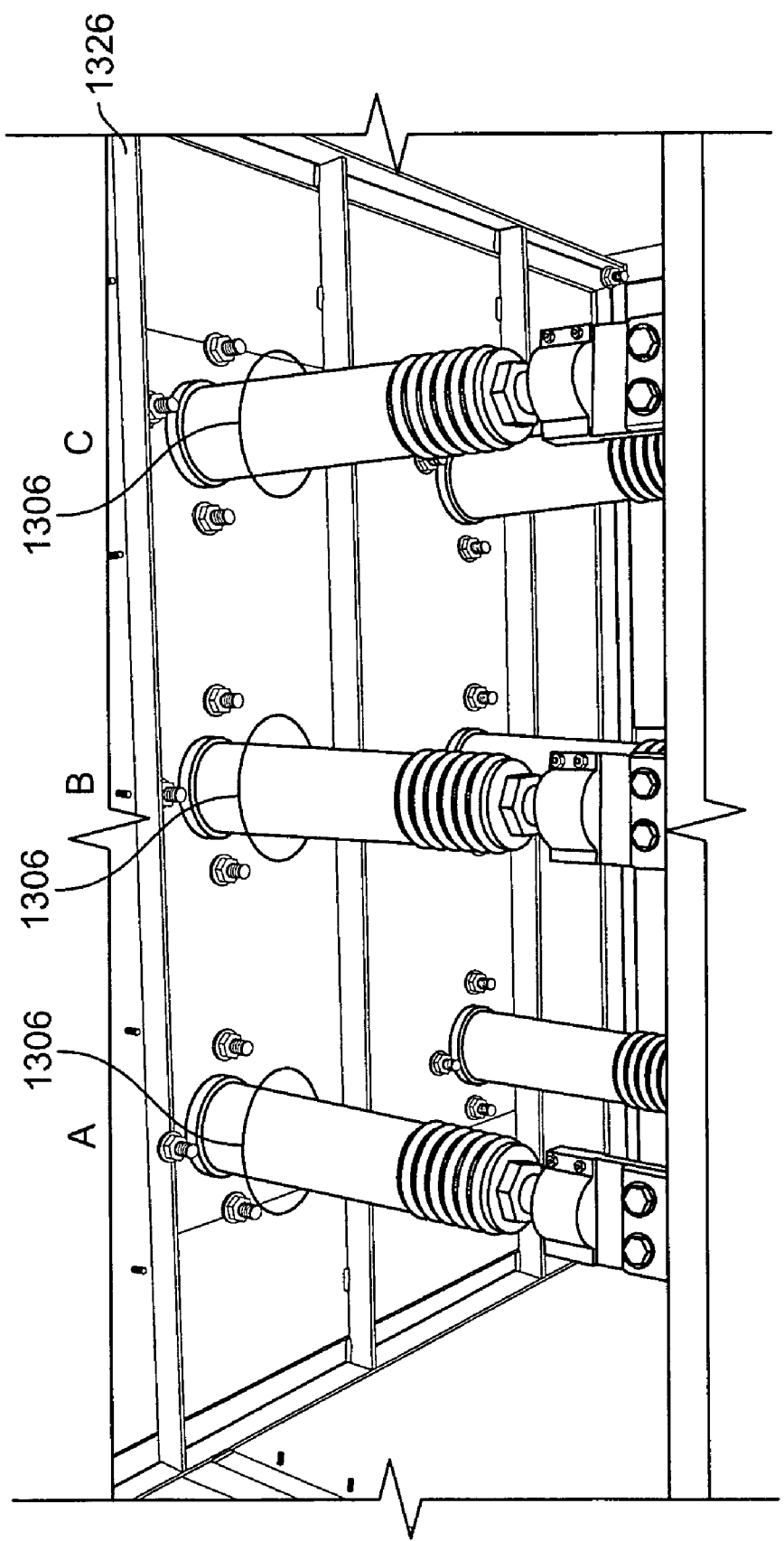
FIG. 15 is a first illustration of Rogowski coils that may be used in the EAF protection system of FIG. 13.
Figure 16:
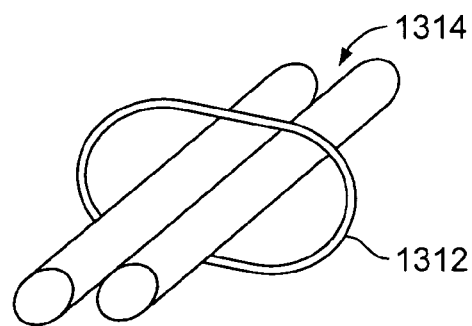
FIG. 16 is a second illustration of Rogowski coils that may be used in the EAF protection system of FIG. 13.

FIG. 15 illustrates of a configuration of the conductors 1302 and coils 1306, where the coils 1306 are integrated into the wall of the vault 1326. FIG. 16 illustrates a coil 1312 configured with two of the conductors 1314 contained within a single coil 1312.

Figure 17:
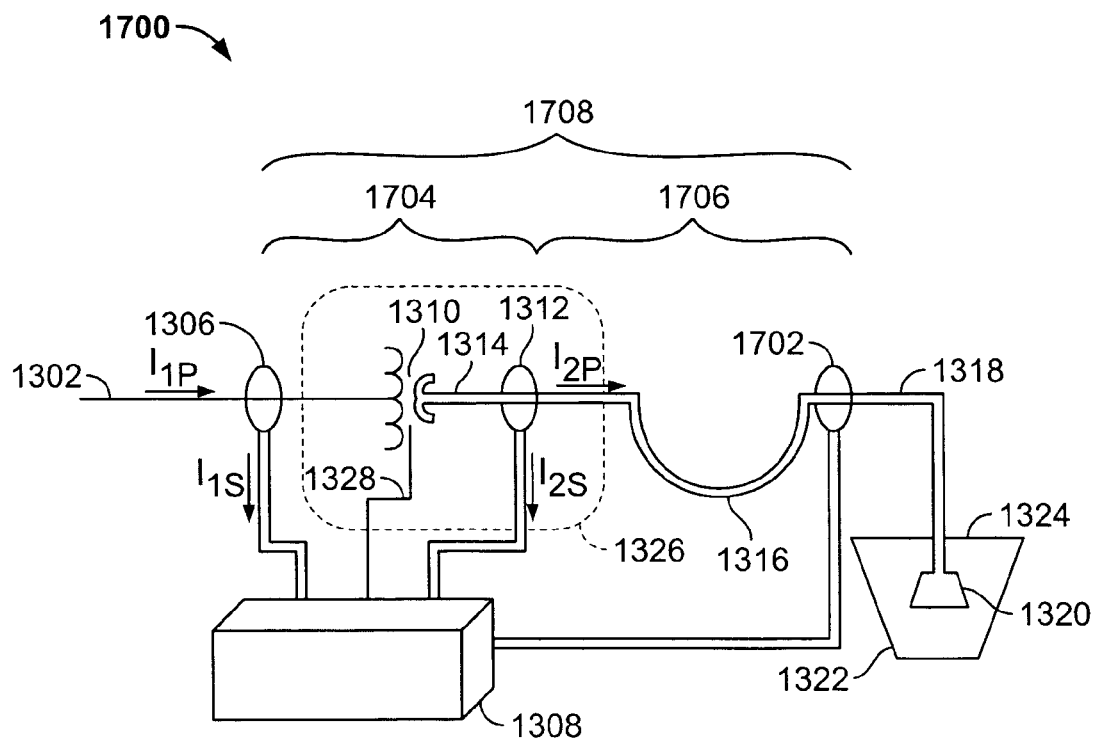
FIG. 17 is a circuit diagram of a second EAF protection system.

FIG. 17 illustrates an EAF protection system 1700 that is similar to the system 1300 of FIG. 13 but includes a third coil 1702 associated with conducting arm(s) 1318 and connected to the relay 1308. As a result, the EAF protection system 1700 provides multiple, redundant, and/or independent protection zones for the various associated EAF components.

For example, a first protection zone 1704 includes all components between coil 1306 and 1310 (e.g., the transformer 1310). A second protection zone 1706 includes all components located between the coil 1312 and the coil 1702 (e.g., the water-cooled leads 1316). Finally, a third protection zone 1708 includes all components located between the coil 1306 and the coil 1702.

Similar to various protection systems described above, the relay 1308 may implement three distinct algorithms that each correspond to one of the protection zones 1704, 1706, and 1708. As a result, the protection zone 1704 is independent of a malfunction of the coil 1702, while the protection zone 1706 is independent of a malfunction of the coil 1306. Finally, the protection zone 1708 is independent of a malfunction of the coil 1312.

Moreover, the EAF protection system 1700 allows both a location and a magnitude of a fault to be determined. Also, with respect to the protection zone 1706, there is no need for information about a position of the tap associated with the transformer 1310. As a result, the protection algorithm for the protection zone 1706 may be simplified with respect to a corresponding algorithm for the protection zone 1704, and, as a result, the relay 1308 may be set more sensitively.

Figure 18:
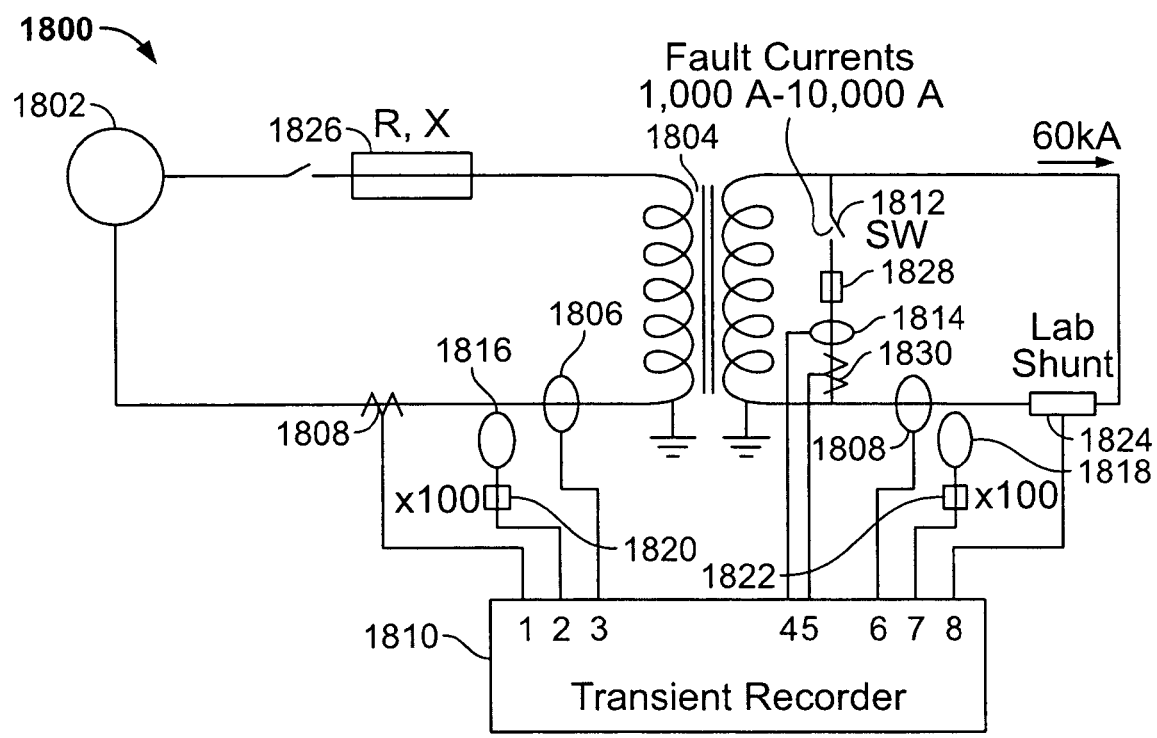
FIG. 18 is a circuit diagram of a first test circuit for testing an electrical protection system.

FIG. 18 is a circuit diagram of a first test circuit for testing an electrical protection system. In FIG. 18, a source 1802 supplies power to a transformer 1804. Specifically, the source 1802 supplies a current having a value of, for example, 2,500 A, which is stepped up by the transformer 1804 to a current having a value of, for example, 60 kA.

A coil 1806 and a coil 1808 are used to detect these currents, and are in communication with channels 3 and 6 of a transient recorder 1810, which may be associated with, or part of, a differential relay such as those described above. A fault (short circuit) is initiated in the test circuit 1800 using a switch 1812, where fault currents may be in the range of, for example, 1 kA–10 kA, and the coils 1806 and 1808 are tested through the range of these fault currents.

A coil 1814 measures differential current for comparison with the output of the coils 1806 and 1808, and communicates with channel 4 of the recorder 1810. A coil 1816 and a coil 1818 are connected to external conductors (not shown) and are used to measure the effects of currents through these external conductors when conducting high currents. The outputs of the coils 1816 and 1818 are multiplied by a multiplier 1820 and a multiplier 1822 (for example, by 100×), respectively, and input into, respectively, channels 2 and 7 of the recorder 1810.

A lab shunt 1824 is used to protect against any undesired or unsafe currents, and is connected to channel 8 of the recorder 1810. A resistor 1826 is connected to the source 1802 in order to limit a current output by the source 1802, while a resistor 1828 is connected to the switch 1812 and used in a similar manner.

Finally, a current transformer 1830 and a current transformer 1832 are used as current sensors that produce current measurements against which the results of the measurements of the various coils may be compared. The current transformers 1830 and 1832 are connected to channels 1 and 5 of the recorder 1810, respectively.

In the test circuit 1800, no external shielding was applied to the various coils, in order to more fully test extreme application conditions (such as might be found in an EAF).

Figure 19:
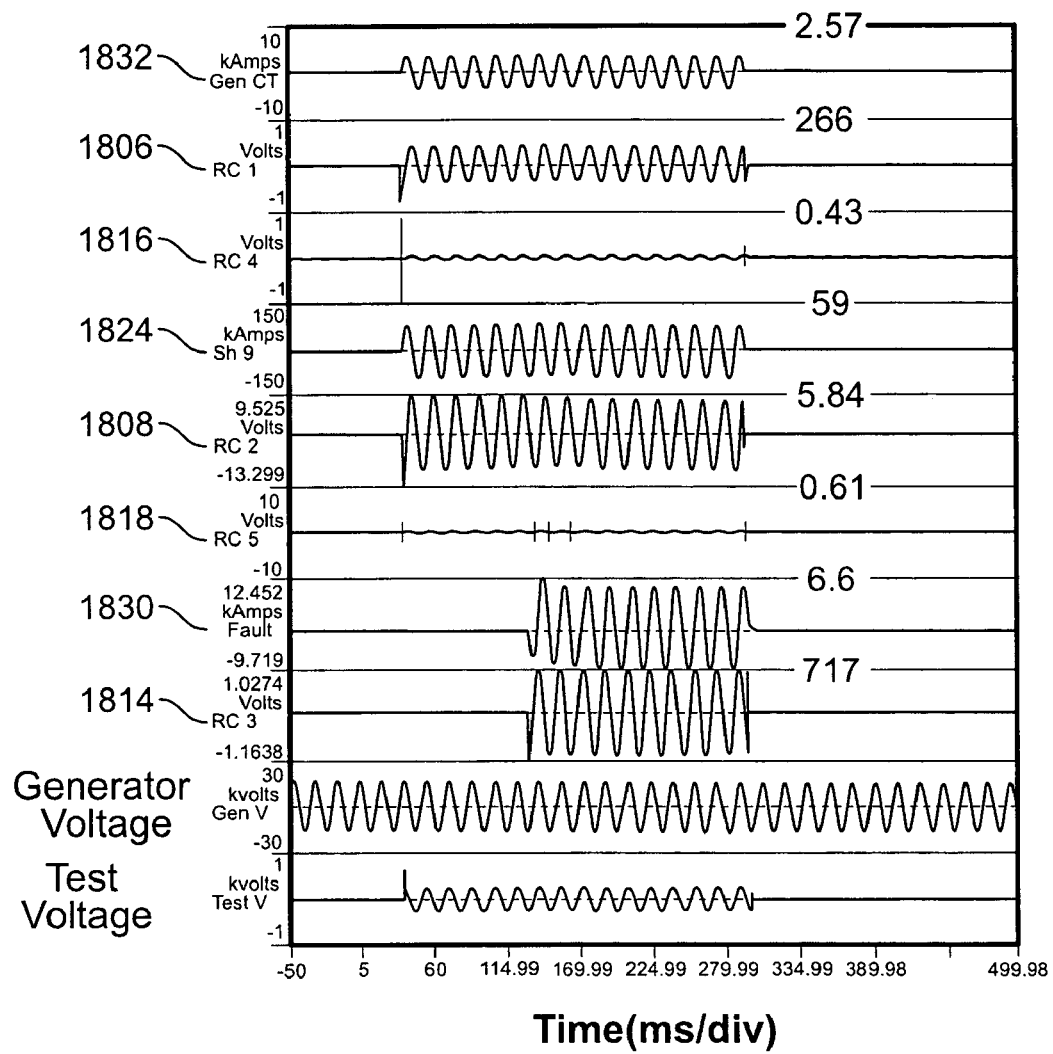
FIG. 19 is a graph of test results of the test circuit of FIG. 18.

FIG. 19 is a graph of test results of the test circuit 1800 of FIG. 18. In FIG. 19, a fault current is used that is approximately 10% of the load current, and resulting waveforms for the various components are illustrated, as labeled.

Figure 20:
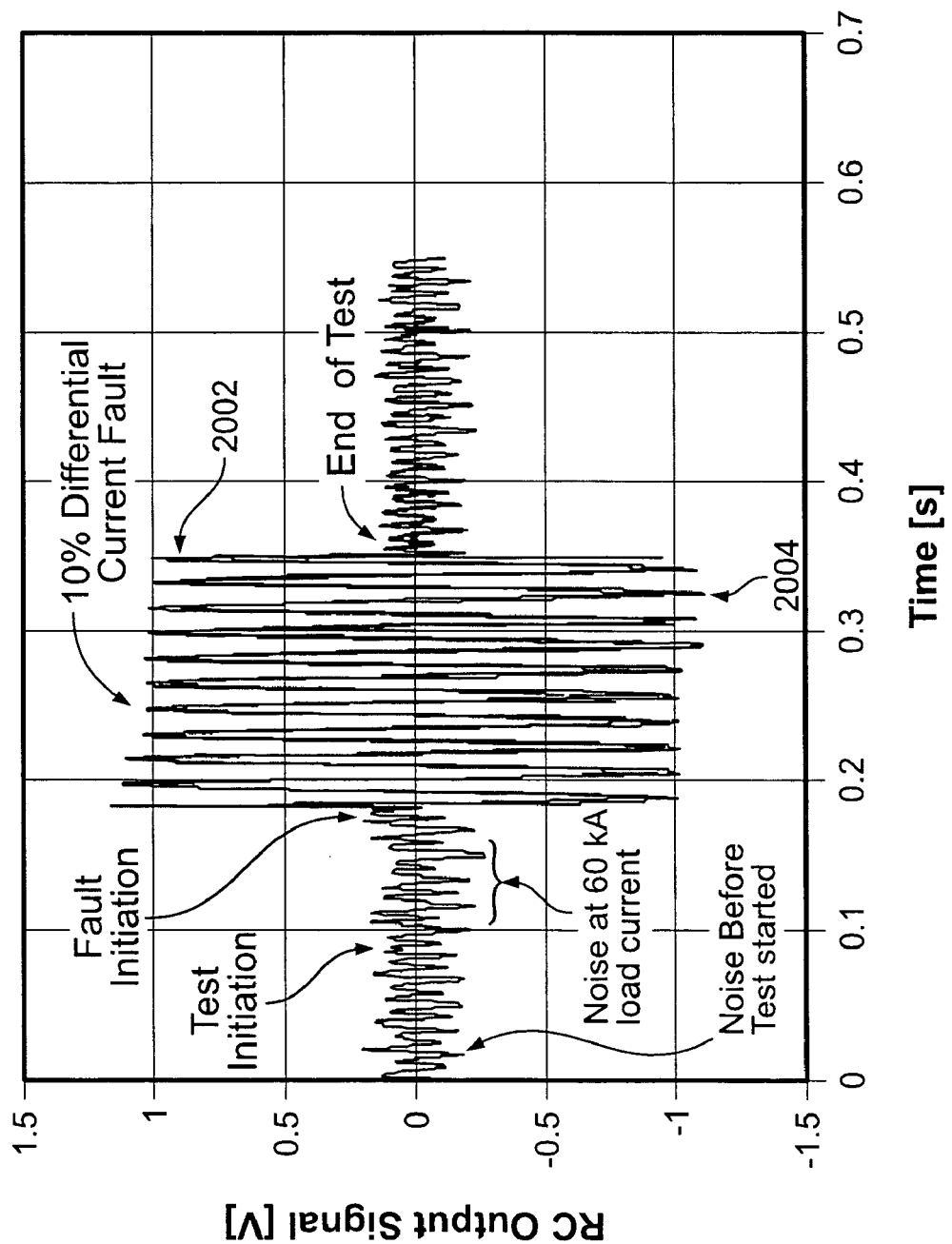
FIG. 20 is a first graph of a comparison of waveforms illustrated in FIG. 19.

FIG. 20 is a first graph of a comparison of waveforms illustrated in FIG. 19. Specifically, in FIG. 20, a first waveform 2002 represents a waveform associated with the coil 1814, which directly measures the fault current, by virtue of its connection to the switch 1812. A second waveform 2004 represents a waveform associated with a difference between the waveforms associated with the coils 1806 and 1808 (scaled by the transformer ratio). The second waveform 2002 contains a noise signal coming from unshielded channels of the recorder 1810. This noise signal is virtually identical after the test as before, and is therefore not likely to have been contributed by any effect associated with one of the various coils.

Figure 21:
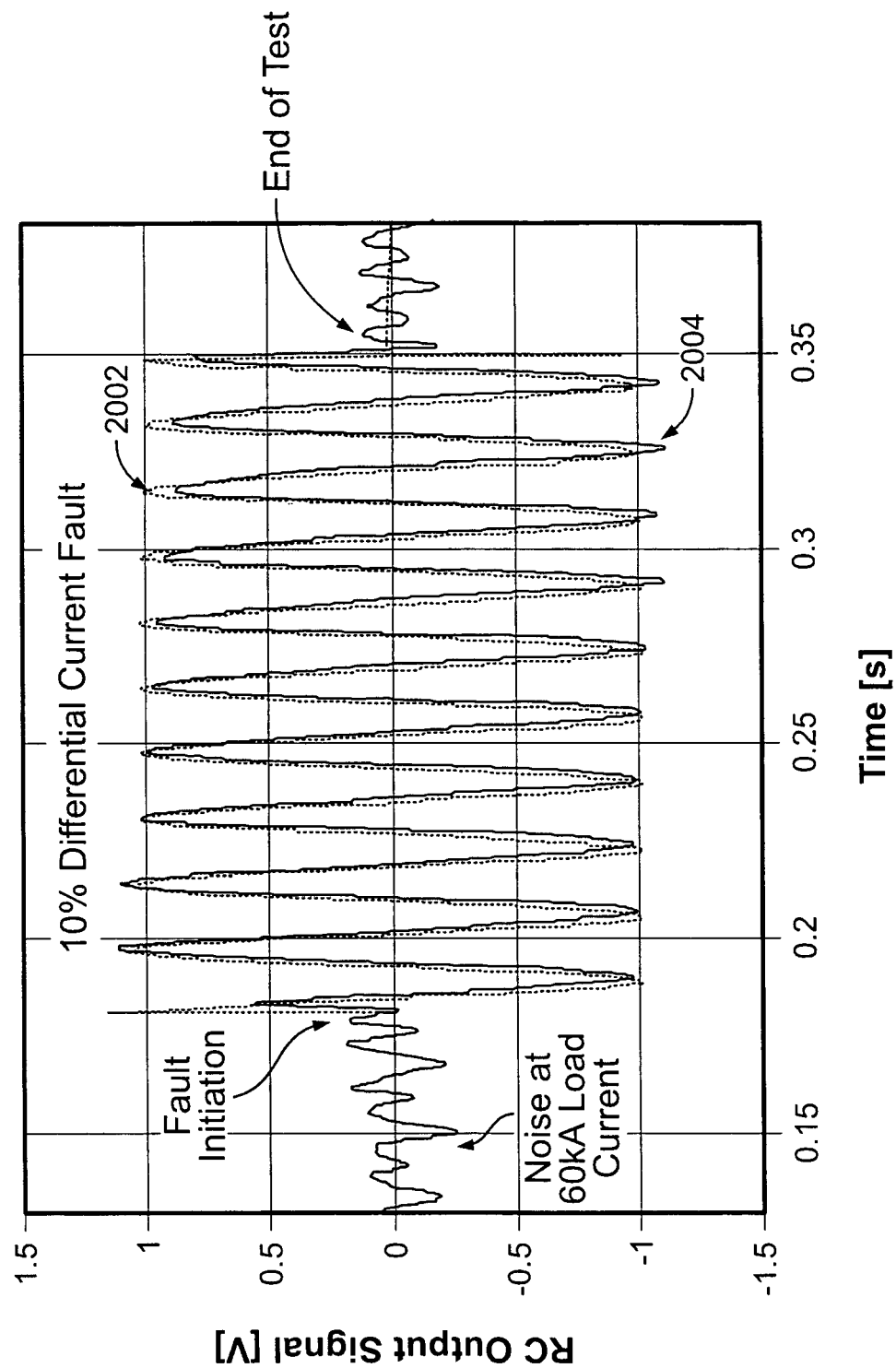
FIG. 21 is a second graph of a comparison of waveforms illustrated in FIG. 19.

FIG. 21 is a second graph of the comparison of waveforms illustrated in FIG. 20. In FIG. 21, the waveform comparison is magnified by 10× for the sake of clarity.

In FIGS. 20 and 21, it is apparent that the two waveforms 2002 and 2004 are virtually identical, thereby establishing an accuracy of the above-described techniques for detecting fault currents using a differential relay and Rogowski coils.

Figure 22:
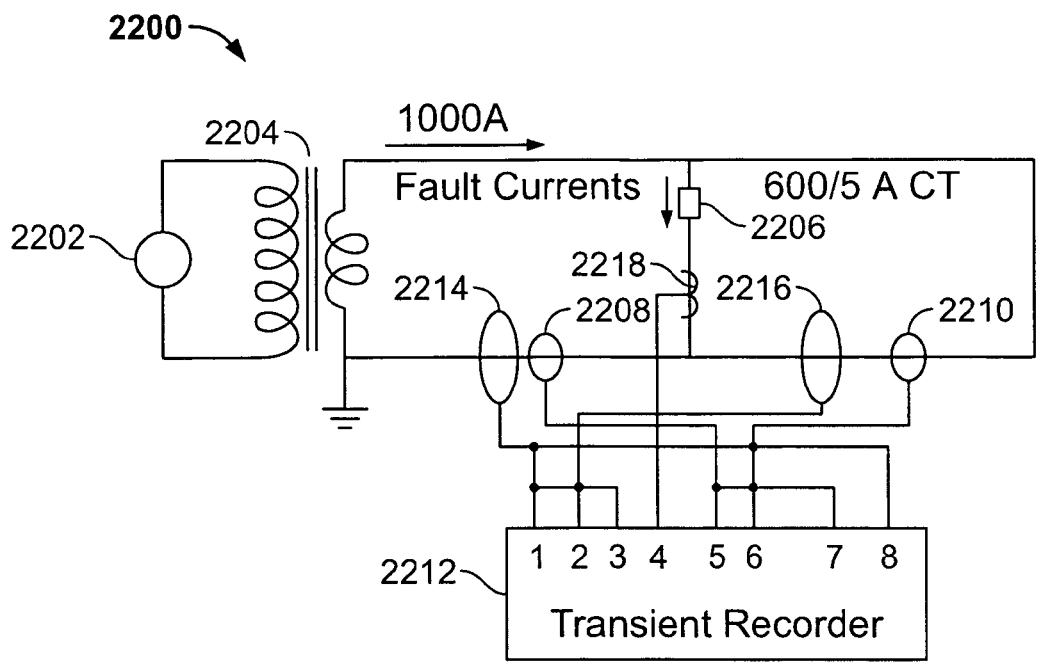
FIG. 22 is a circuit diagram of a second test circuit for testing an electrical protection system.

FIG. 22 is a circuit diagram of a second test circuit 2200 for testing an electrical protection system. In FIG. 22, a power source 2202 supplies power to a transformer 2204. A fault current is initiated using a circuit element 2206, which may be, for example, a current-limiting resistor. A first round coil 2208 and a second round coil 2210 detect currents at their respective locations and communicate results to a recorder 2212. In addition, a first oval coil 2214 and a second oval coil 2216 detect currents at their respective locations and communicate results to the recorder 2212. Finally, a current transformer 2218 measures the fault current for comparison to the results calculated based on the coils 2208, 2210, 2214, and 2216. The current transformer 2218 may be, for example, a 6005 A current transformer.

Channel 1 of the recorder 2212 detects an output of the first oval coil 2214, channel 2 of the recorder 2212 detects an output of the second oval coil 2216, and channel 3 determines a difference of the two oval coils 2214 and 2216. Channel 4 of the recorder 2212 detects an output of the current transformer 2218. Channel 5 detects an output of the first round coil 2208, channel 6 detects an output of the second round coil 2210, and channel 7 determines a difference between the first round coil 2208 and the second round coil 2210. Finally, channel 8 determines a difference between the first oval coil 2214 and the second round coil 2210.

Figure 23:
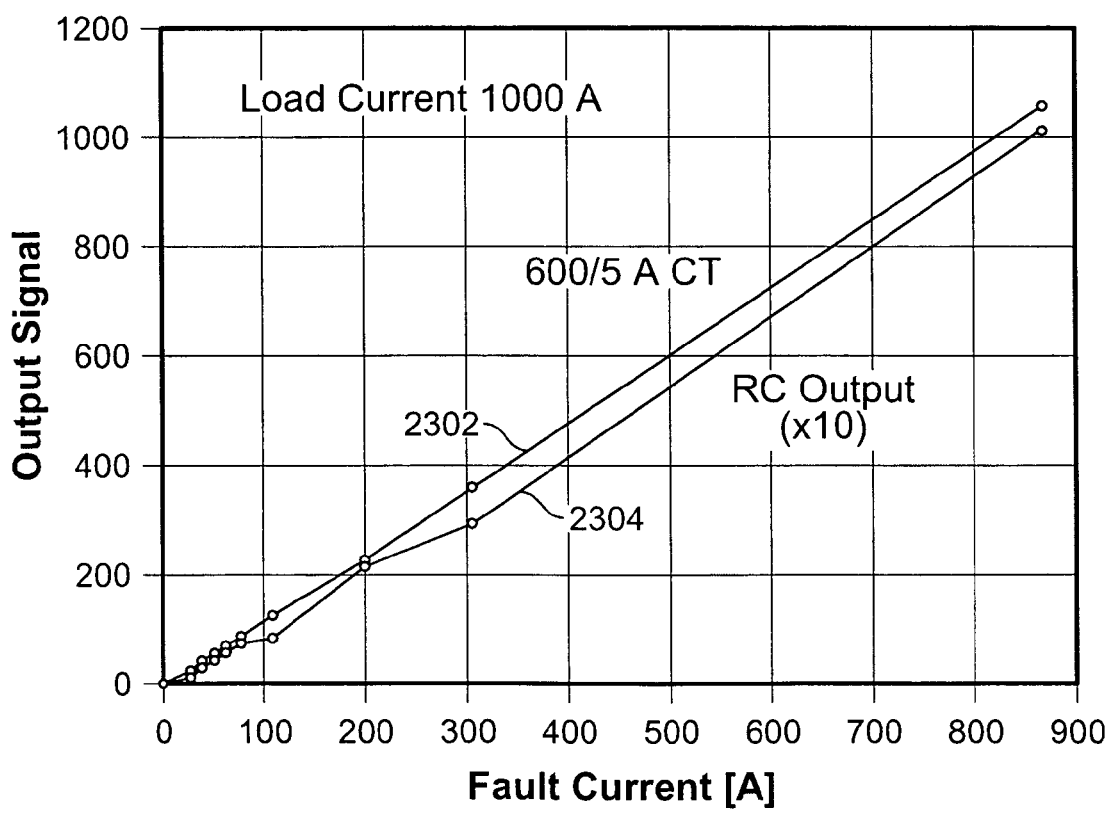
FIG. 23 is a graph demonstrating a result of a simulation of the test circuit of FIG. 22.

FIG. 23 is a graph demonstrating a result of a simulation of the test circuit 2200 of FIG. 22. In FIG. 23, a 1 kA load current was used, along with fault levels in the range of 10 A to 850 A. A first line 2302 represents the resulting measurements of the current transformer 2218, while a second line 2304 represents the resulting measurements of the various coils (multiplied by a factor of 10). As is evident in FIG. 23, current measurements based on the various coils of FIG. 22 are highly sensitive and responsive to the tested fault conditions.

In conclusion, the above description illustrates various protection systems for electrical systems such as, for example, spot networks, substation power dividers, and electrical arc furnaces. The various protection systems may be designed and used to detect and clear faults that may occur within the electrical systems. For example, a pair of Rogowski coils may be used to detect current along conductors at their respective locations on the conductors, and to output corresponding signals to a multi-function, differential relay having multiple voltage and current inputs. By comparing the signals from the Rogowski coils, the differential relay may determine whether a fault exists at some point along the conductors and between the pair of Rogowski coils. Further, the relay may then, in response to the fault, trip a circuit breaker or other network protection device to correct the fault.

Moreover, when multiple relays are included, at least one of the relays may be in communication with one or more of the other relays, and/or with one or more of the Rogowski coils associated with one of the other relays. In this way, many different protection schemes may be designed and used, including differential schemes and overcurrent sensing schemes. Additionally, each of the various relays can be designed to provide very fast back-up functionality for one or more of the other relays.

A number of implementations have been described. Nevertheless, it will be understood that various modifications may be made. Accordingly, other implementations are within the scope of the following claims.

What is claimed is:

1. An electrical protection system comprising:
   a first Rogowski coil positioned to detect a first current and generate a first current measurement;
   a second Rogowski coil positioned to detect a second current and generate a second current measurement, wherein a first protection zone is defined based on a positioning of the first Rogowski coil and the second Rogowski coil; and
   a first protection device operable to determine from the first current measurement and the second current measurement, the existence of a first fault that is associated with a first circuit element within the first protection zone.

2. The system of claim 1 wherein the first protection device is operable to detect the first fault using a first protection scheme.

3. The system of claim 2 wherein the first protection scheme is a differential protection scheme.

4. The system of claim 3 wherein the second Rogowski coil defines a second protection zone containing a second circuit element, and the first protection device is operable to implement a second protection scheme to detect a second fault associated with the second circuit element.

5. The system of claim 4 wherein the second protection scheme includes an overcurrent protection scheme.

6. The system of claim 5 wherein the first protection device is operable to integrate protection of the first protection zone and the second protection zone.

7. The system of claim 6 wherein the first protection device is operable to provide a third protection zone that serves as a back-up protection zone to the first protection zone and the second protection zone.

8. The system of claim 1 wherein the first protection device is a first differential relay.

9. The system of claim 1 further comprising a first circuit breaker operable to receive a first instruction from the first protection device and interrupt the first current in response to the first instruction.

10. The system of claim 9 wherein the first Rogowski coil, the second Rogowski coil, the first protection device, and the first circuit breaker are all associated with a first network unit of an electrical network system.

11. The system of claim 10 further comprising:
    a third Rogowski coil positioned to detect a third current and generate a third current measurement;
    a fourth Rogowski coil positioned to detect a fourth current and generate a fourth current measurement, wherein a second protection zone is defined based on a positioning of the third Rogowski coil and the fourth Rogowski coil; and
    a second protection device operable to determine from the third current measurement and the fourth current measurement, the existence of a second fault that is associated with a second circuit element within the second protection zone.

12. The system of claim 11 wherein the second protection device is a second differential relay.

13. The system of claim 11 further comprising a second circuit breaker operable to receive a second instruction from the second protection device and interrupt the third current in response to the second instruction.

14. The system of claim 13 wherein the third Rogowski coil, the fourth Rogowski coil, the second protection device, and the second circuit breaker are all associated with a second network unit of the electrical network system.

15. The system of claim 14 further comprising a communications link between the first protection device and the second protection device.

16. The system of claim 15 wherein the first network unit and the second network unit are connected through a bus connection.

17. The system of claim 16 wherein the first protection device and the second protection device share the first current measurement, the second current measurement, the third current measurement, and the fourth current measurement over the communications link, and use the current measurements to determine that a bus fault associated with the bus connection exists.

18. The system of claim 15 wherein the second protection device receives a detection notification through the communications link indicating detection of the first fault by the first protection device.

19. The system of claim 18 wherein the second protection device sends the second instruction to the second circuit breaker in response to the detection notification.

20. The system of claim 18 wherein the second protection device waits a predetermined amount of time after the detection notification before sending the second instruction.

21. The system of claim 20 wherein, when the second protection device receives, before the predetermined amount of time has elapsed, an operation notification indicating operation of the first circuit breaker in response to the first instruction, the second protection device does not send the second instruction.

22. The system of claim 20 wherein, when the second protection device does not receive, before the predetermined amount of time has elapsed, an operation notification indicating operation of the first circuit breaker, the second relay sends the second instruction to the second circuit breaker after the predetermined time has elapsed.

23. The system of claim 15 wherein the third Rogowski coil, the fourth Rogowski coil, and the second circuit breaker are connected to the first protection device.

24. The system of claim 23 wherein:
the first protection device is operable to receive a malfunction notification indicating a malfunction of the second protection device, and
the first protection device is operable to receive the third current measurement and the fourth current measurement and determine that the second fault exists based on the current measurement.

25. The system of claim 24 wherein the first protection device is operable to operate the second circuit breaker in response to the second fault.

26. The system of claim 1 further comprising a third Rogowski coil positioned to detect a third current and generate a third current measurement, wherein a second protection zone is defined based on a positioning of the first Rogowski coil and the third Rogowski coil, and a third protection zone is defined based on a positioning of the second Rogowski coil and the third Rogowski coil.

27. The system of claim 26 wherein the first protection device is operable to determine from the first current measurement and the third current measurement that a second fault exists that is associated with a second circuit element within the second protection zone.

28. The system of claim 26 wherein the first protection device is operable to determine from the second current measurement and the third current measurement that a third fault exists that is associated with a third circuit element within the third protection zone.

29. The system of claim 1 wherein:
the first current is associated with a first conductor associated with a primary winding of a power transformer,
the second current is associated with a second conductor associated with a secondary winding of the power transformer, and
the power transformer is the first circuit element.

30. A method for protecting an electrical system, the method comprising:
measuring a first current through a first conductor in an electrical system using a first Rogowski coil positioned along the first conductor;
outputting a first current signal corresponding to the first current;
measuring a second current through a second conductor in the electrical system using a second Rogowski coil positioned along the second conductor;
outputting a second current signal corresponding to the second current; and
providing the first current signal and the second current signal to a first protection device.

31. The method of claim 30 comprising:
providing differential protection to a first circuit element that is positioned within a first protection zone of the electrical system that is defined between the first Rogowski coil and the second Rogowski coil, using the first protection device; and
providing overcurrent protection to a second circuit element that is positioned within a second protection zone of the electrical system that is defined by a position of the second Rogowski coil, using the first protection device.

32. The method of claim 31 comprising:
providing back-up protection within a third protection zone that includes the first protection zone and the second protection zone, using the first protection device.

33. The method of claim 30 wherein the first protection device includes a differential relay.

34. The method of claim 30 wherein the first conductor and the second conductor are included within a first network unit of the electrical system.

35. The method of claim 34 further comprising determining, based on the first current signal and the second current signal, that a fault associated with the first network unit exists in the electrical system.

36. The method of claim 34 further comprising:
measuring a third current through a third conductor in the electrical system using a third Rogowski coil positioned along the third conductor;
outputting a third current signal corresponding to the third current;
measuring a fourth current through a fourth conductor in the electrical system using a fourth Rogowski coil positioned along the fourth conductor;
outputting a fourth current signal corresponding to the fourth current; and
providing the third current signal and the fourth current signal to a second protection device.

37. The method of claim 36 wherein the second protection device includes a differential relay.

38. The method of claim 36 wherein the third conductor and the fourth conductor are included within a second network unit of the electrical system.

39. The method of claim 38 further comprising determining, based on the third current signal and the fourth current signal, that a fault associated with the second network unit exists.

40. The method of claim 38 wherein the first protection device and the second protection device are connected by a communications link.

41. The method of claim 40 further comprising:
transmitting the first current signal and the second current signal from the first protection device to the second protection device; and
determining, at the second protection device and based on the first current signal and the second current signal, that a fault associated with the first network unit exists.

42. The method of claim 40 further comprising:
determining, at the first protection device and based on the first current signal and the second current signal, that a fault exists in the first network unit; and
transmitting from the first protection device to the second protection device a fault notification indicating the existence of the fault.

43. The method of claim 42 further comprising:
opening a first circuit breaker associated with the first network unit in response to the fault; and
transmitting a clearance notification from the first protection device to the second protection device, through the communications link and in response to the opening of the circuit breaker.

44. The method of claim 43 further comprising opening a second circuit breaker associated with the second network unit in response to the fault notification.

45. The method of claim 43 further comprising routing, in response to the clearance notification, electrical power from the second network unit to the first network unit, through a connection bus connecting the first network unit and the second network unit.

46. The method of claim 40 wherein:
the electrical system comprises a connection bus connecting the first network unit to the second network unit, and
the connection bus is connected to the second conductor and the fourth conductor between the first Rogowski coil and the second Rogowski coil.

47. The method of claim 46 further comprising:
transmitting the first current signal and the second current signal from the first protection device to the second protection device;
transmitting the third current signal and the fourth current signal from the second protection device to the first protection device; and
determining that a fault associated with the connection bus exists, based on the first current signal, the second current signal, the third current signal, and the fourth current signal.

48. The method of claim 36 further comprising:
transmitting the third current signal from the third Rogowski coil to the first protection device, through a first connection;
transmitting the fourth current signal from the fourth Rogowski coil to the first protection device, through a second connection; and
determining, at the first protection device and based on the third current signal and the fourth current signal, that a fault associated with the second network unit exists.

49. The method of claim 30 further comprising:
measuring a third current through a third conductor in the electrical system using a third Rogowski coil positioned along the third conductor;
outputting a third current signal corresponding to the third current; and
inputting the third current signal at the first protection device.

50. The method of claim 49 further comprising determining that a fault exists between the first Rogowski coil and the third Rogowski coil based on the first current signal and the third current signal.

51. The method of claim 49 further comprising determining that a fault exists between the third Rogowski coil and the second Rogowski coil based on the third current signal and the second current signal.

52. An electrical protection system comprising:
a first pair of Rogowski coils operable to generate a first pair of current signals, the first pair of current signals being associated with a first network unit of the electrical system;
a second pair of Rogowski coils operable to generate a second pair of current signals, the second pair of current signals being associated with a second network unit of the electrical system; and
a first protection device associated with the first network unit and operable to receive and process the first pair of current signals and the second pair of current signals.

53. The system of claim 52 wherein the first protection device provides integrated protection to the first network unit, the integrated protection including at least a first protection scheme and a second protection scheme, based on at least one of the first pair of current signals.

54. The system of claim 52 wherein the first protection device is operable to determine, based on the first pair of current signals, that a fault associated with the first network unit exists.

55. The system of claim 52 further comprising a second protection device associated with the second network unit and operable to input the second pair of current signals.

56. The system of claim 55 wherein the first protection device acts as a back-up to the second protection device in detecting that a fault associated with the second network unit exists.

57. The system of claim 56 wherein the first protection device receives the second pair of current signals from the second pair of Rogowski coils.

58. The system of claim 57 wherein the first protection device receives the second pair of current signals through the second protection device.

59. The system of claim 55 wherein the first protection device and the second protection device are connected to one another through a communications link.

60. The system of claim 59 further comprising a connection bus connecting the first network unit and the second network unit.

61. The system of claim 60 wherein the first protection device and the second protection device determine that a bus fault exists in the connection bus based on the first pair of current signals and the second pair of current signals.

* * * * *